United States Patent
Shively, II

[11] Patent Number: 5,844,557
[45] Date of Patent: *Dec. 1, 1998

[54] SYSTEM AND METHOD FOR DETECTING SCREEN HOTSPOTS

[75] Inventor: Darrell M. Shively, II, El Toro, Calif.

[73] Assignee: AST Research, Inc., Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 768,049

[22] Filed: Dec. 16, 1996

Related U.S. Application Data

[63] Continuation of Ser. No. 323,487, Oct. 14, 1994, abandoned.

[51] Int. Cl.$^6$ ............................................. G06F 3/14
[52] U.S. Cl. ............................................. 345/339; 345/348
[58] Field of Search ............................................. 395/344, 343, 395/339, 348, 349, 356, 357; 345/115, 145, 344, 343, 339, 348, 356, 357

[56] References Cited

U.S. PATENT DOCUMENTS

| | | | |
|---|---|---|---|
| 4,601,003 | 7/1986 | Yoneyama et al. | 345/351 |
| 5,202,671 | 4/1993 | Aranda et al. | 345/115 |
| 5,317,680 | 5/1994 | Ditter, Jr. | 345/435 |
| 5,347,628 | 9/1994 | Brewer et al. | 345/351 |
| 5,349,658 | 9/1994 | O'Rourke et al. | 345/349 |
| 5,394,521 | 2/1995 | Henderson, Jr. et al. | 345/346 |
| 5,442,736 | 8/1995 | Cummins | 345/434 |
| 5,463,728 | 10/1995 | Blahut et al. | 345/344 |
| 5,737,553 | 4/1998 | Bartok | 345/339 |

FOREIGN PATENT DOCUMENTS

0567220A3  10/1993  European Pat. Off. .

Primary Examiner—Matthew M. Kim
Assistant Examiner—Crescelle N. dela Torre
Attorney, Agent, or Firm—Knobbe, Martens, Olson & Bear, LLP

[57] ABSTRACT

The system and method of the present invention for detecting screen hotspots provides a graphical user interface environment that enables a user to select screen hotspots that are graphically represented by complex shapes and multiple colors. The use of complex-shaped multi-colored hotspots enables the creation of more realistic graphical representations implementing screen hotspots. Monochrome bitmaps, or masks, are created for each and every hotspot of each and every window view that may be displayed on a screen. Each mask defines valid coordinates for the corresponding hotspots such that, so long as a cursor is located on a valid coordinate, the user can select that hotspot, regardless of the complex shape or multiple colors used to graphically represent the hotspot.

1 Claim, 11 Drawing Sheets

SYSTEM AND METHOD FOR DETECTING SCREEN HOTSPOTS

This is a continuation of application Ser. No. 08/323,487, filed on Oct. 14 1994 now abandoned and which designated the U.S.

FIELD OF THE INVENTION

This invention relates to a computer system graphical user interface (GUI), and more specifically to a system and method for detecting interactive screen regions known as hotspots.

BACKGROUND OF THE INVENTION

Modern computer systems employ graphical user interfaces (GUI) to present information to a computer user in a user-friendly graphical environment. Rather than requiring a working knowledge of arcane textual commands, GUIs typically allow the user to operate a computer program by positioning an arrow, pointing finger, or other shaped cursor, over an object and clicking a button to select that object. The use of a pointing device, such as a mouse or trackball, to point-and-click selected objects displayed on a screen within a window is well known in the art. Typically, the cursor is positioned over an object (point) and actively selected by pressing a button on the pointing device (click). Examples of GUIs presently in use are the Apple Macintosh operating system, and the Microsoft Windows graphical environment for DOS systems. Both of these GUIs are capable of displaying multiple windows, or views, on a single screen.

GUIs typically enable the user to point-and-click on an object by making a region of the screen that defines the object sensitive to user interaction. In this way, when the user positions the cursor over an interactive screen object, such as a button or menu, the GUI is able to detect that the cursor is positioned over the interactive screen object since the location of all interactive screen objects are defined. These interactive regions of the screen are commonly referred to as hotspots.

A typical hotspot is rectangular, and is defined by upper-left coordinates and lower-right coordinates of the rectangular region on the screen. Thus, whenever the cursor is positioned over any portion of the rectangular region formed by the upper-left and lower-right coordinates, the GUI determines that the cursor is pointing to the hotspot defined by such coordinates. This implementation explains why most objects displayed in a GUI graphical environment are rectangular in shape. An example of a typical rectangular button is shown in FIG. 1. Users familiar with the Microsoft Windows graphical environment are aware that the pair of rectangular buttons B1 and B2 shown in FIG. 1 are interactive screen objects, or hotspots, that enable the user to minimize or maximize a particular window displayed on the screen.

However, even when objects displayed on the screen are not rectangular (eg. circular, triangular, irregular or complex shaped, etc.), they are still typically defined by rectangular coordinates stretching beyond the border of the object such that when the cursor is not positioned over the graphical representation of the object, but still within the rectangular coordinates defining the object, the system determines that the cursor is pointing to the object, although the cursor is not positioned over the object precisely.

While this is sufficient for most object selection purposes, such leeway in the selection of an object can be troublesome when non-rectangular objects are placed in close proximity to each other on the screen. An example of such a situation is a graphical representation of a geographical map displaying bordering countries. Since the borders of most countries are not perfectly rectangular, and yet they are located adjacent to each other, it is clear that the method described above of using rectangular coordinates to define non-rectangular objects of complex shapes would cause numerous overlaps, such that by positioning the cursor at a specific point on the screen, the user could feasibly select a plurality of countries at the same time.

A common solution for such a situation is to color code the individual countries, wherein each individual country, shown as a single color, represents an individual hotspot. FIG. 2 shows, in shades of black and white, a representation of such a collection of complex shaped, single colored hotspots, wherein it is assumed for illustrative purposes that C1 is black, C2 is orange, C3 is red, C4 is purple, C5 is blue, C6 is green, and C7 is yellow. With the graphical representation of the various countries color coded in this way, the system determines the position of the cursor and the color of the object the cursor is pointing to, and then consults a color-to-object look-up table. However, this only works when each country is defined by a single color scheme. If any attempt is made to add realism to the illustration by using more than one color for any given country, then the color-to-object method may not work.

Thus, although simple shapes, or complex shapes with single colors, can be handled by the presently available methods of defining hotspots in a GUI environment, there is no system or method available for selecting complex shapes with multiple colors in a GUI environment.

For example, presently available graphical representations of computer system components for diagnostic point-and-click selection of various components provide displays with either unrealistic rectangular shapes for all components in the computer system, unrealistic single-colored components in the computer system with no adjacent similar colors, or complex shaped components separated by distances to prevent overlapping of rectangular coordinates defining such shapes.

A drawback of such a display is that viewing purple, yellow, orange, or red circuit cards inside a computer system does not provide the user with a realistic representation of the actual components within the computer system, and thus, does not provide a beneficial familiarity to the user when the user removes the actual computer system cover for the first time.

Therefore, a better solution is needed to provide a GUI environment that enables a user to select a graphically displayed object by pointing-and-clicking on a hotspot regardless of the complex shape and multiple colors used to graphically represent the object corresponding to the hotspot.

SUMMARY OF THE INVENTION

The system and method of the present invention for detecting screen hotspots provides a GUI environment that enables a user to select a graphically displayed object by pointing-and-clicking on a hotspot regardless of the complex shape and multiple colors used to graphically represent the object corresponding to the hotspot.

In a preferred embodiment of the system and method of the present invention for detecting screen hotspots, an artist creates a plurality of realistic window views of computer system components by making use of many adjacent complex shapes in as many colors as required to provide a realistic graphical representation of the computer system components. These views comprise a plurality of hotspots that enable a user to point-and-click on various interactive screen objects displayed within a specific window view. For example, in one view of an enclosed computer system, the user points-and-clicks on a hotspot, such as a computer system cover, in order to graphically remove the cover and view the computer system's internal components.

Once the artist finishes creating these window views, individual monochrome bitmaps are created to represent each window view. Monochrome bitmaps are created for each and every hotspot of each and every window view that may be displayed on a screen. These monochrome bitmaps are referred to as masks, and each mask comprises a plurality of black pixels and a plurality of white pixels. The black pixels within a particular mask have coordinates that correspond to a particular hotspot. Thus, if a particular window view displays two hotspots, then that window view will have two monochrome bitmaps associated with that window view, wherein the black pixels in a first monochrome bitmap corresponds to a first hotspot, and the black pixels in a second monochrome bitmap corresponds to a second hotspot. Every pixel in a specific mask that correlates to a specific hotspot is black, and the coordinates of these pixels are defined as valid. All other pixels in the specific mask are white, and the coordinates of these other pixels are defined as invalid.

In this manner, a specific mask defines as valid the coordinates of every pixel of its corresponding interactive screen object or hotspot. Thus, since the coordinates of every pixel of every hotspot is defined as valid, so long as the cursor is positioned over one of these valid coordinates, the user is able to select that particular hotspot, regardless of the complex shapes and multiple colors used to graphically represent that particular hotspot.

In creating a realistic graphical representation of the computer system components, the artist uses complex shapes and multiple colors to define interactive screen objects. Since the artist has already created these objects, the task of creating corresponding monochrome bitmaps for these objects is simplified. The artist simply makes use of the pre-existing multi-colored complex shaped objects and creates corresponding monochrome bitmaps called masks that define valid coordinates for each specific interactive screen hotspot.

Accordingly, it is an object of the present invention to provide an improved system and method for detecting screen hotspots.

It is a further object of the present invention to provide a system and method for detecting screen hotspots that are non-rectangular.

An additional object of the present invention is to provide a system and method for detecting screen hotspots that are complex shapes and multiple colors.

Further objects and advantages of the present invention will become apparent from a consideration of the drawings and ensuing description.

DETAILED DESCRIPTION OF A PREFERRED EMBODIMENT

Figure 1:
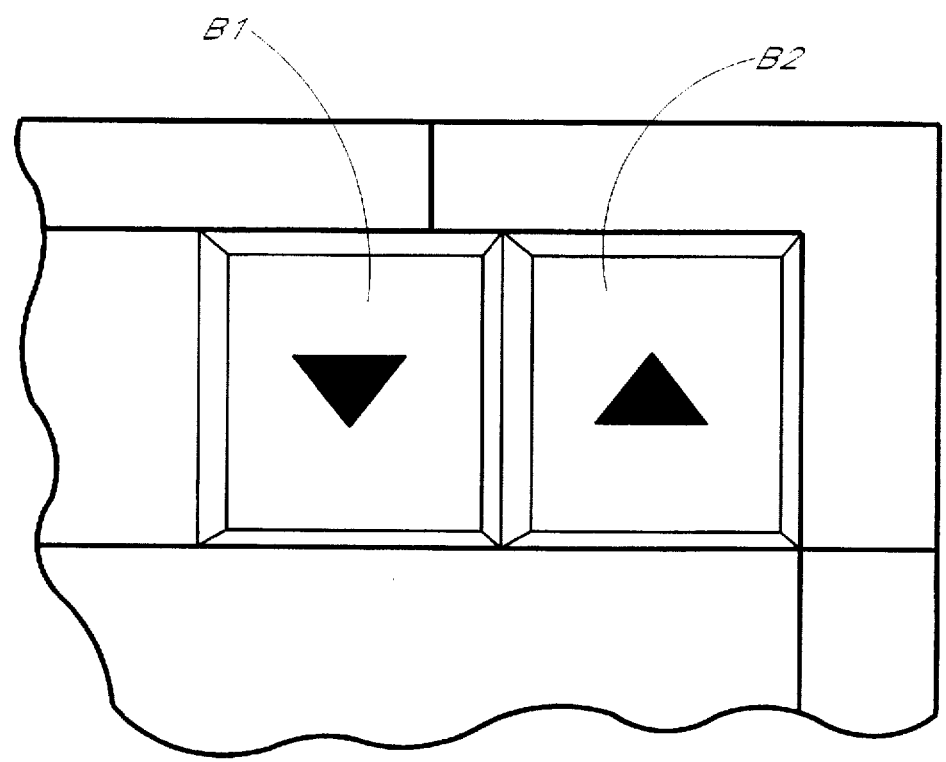
FIG. 1 is an illustration of a pair of rectangular buttons defining a pair of hotspots used for minimizing and maximizing a particular window in a graphical user interface environment.
Figure 2:
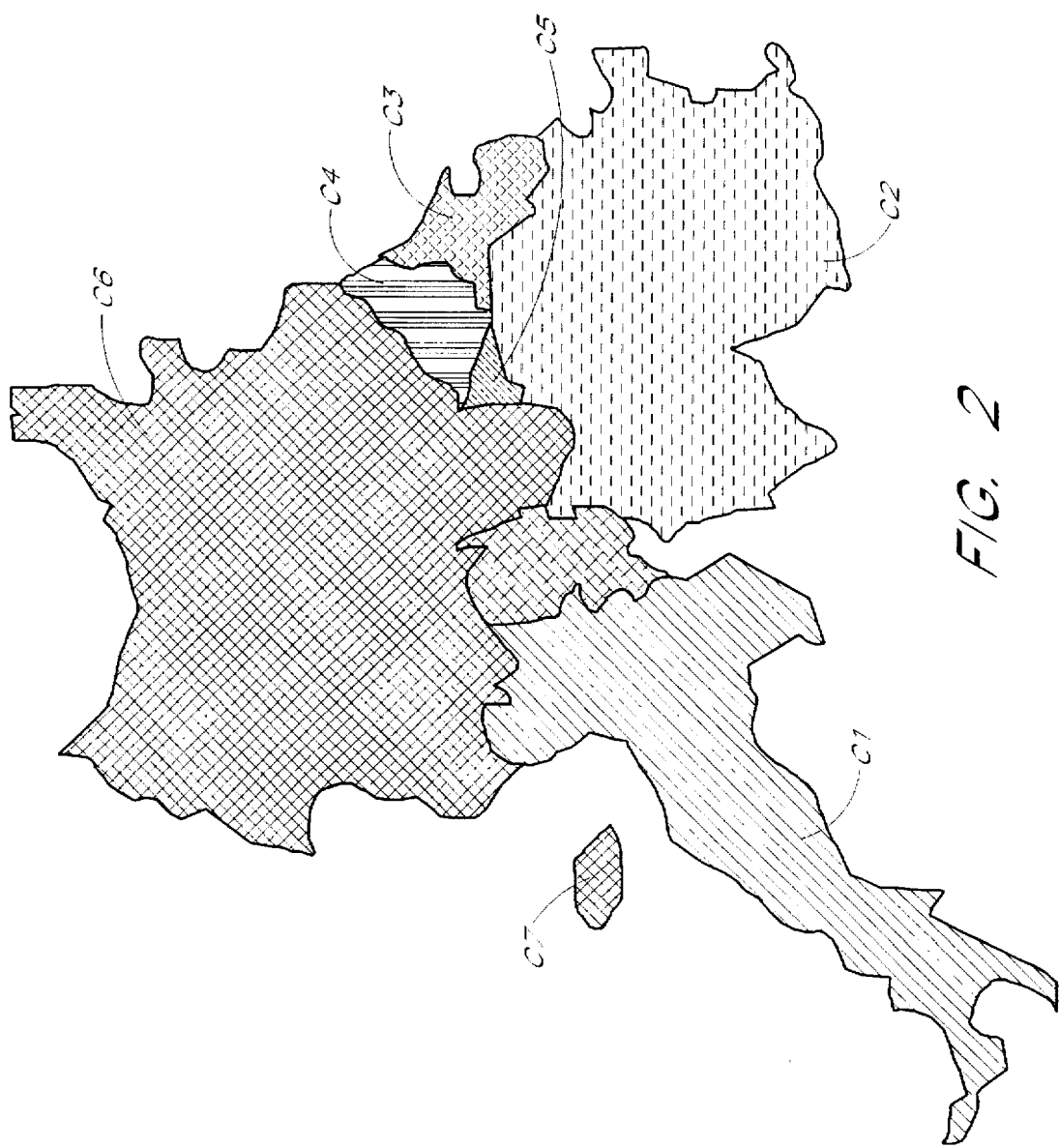
FIG. 2 is an illustration of a geographical map that shows hotspots represented by complex shapes in single colors.
Figure 3:
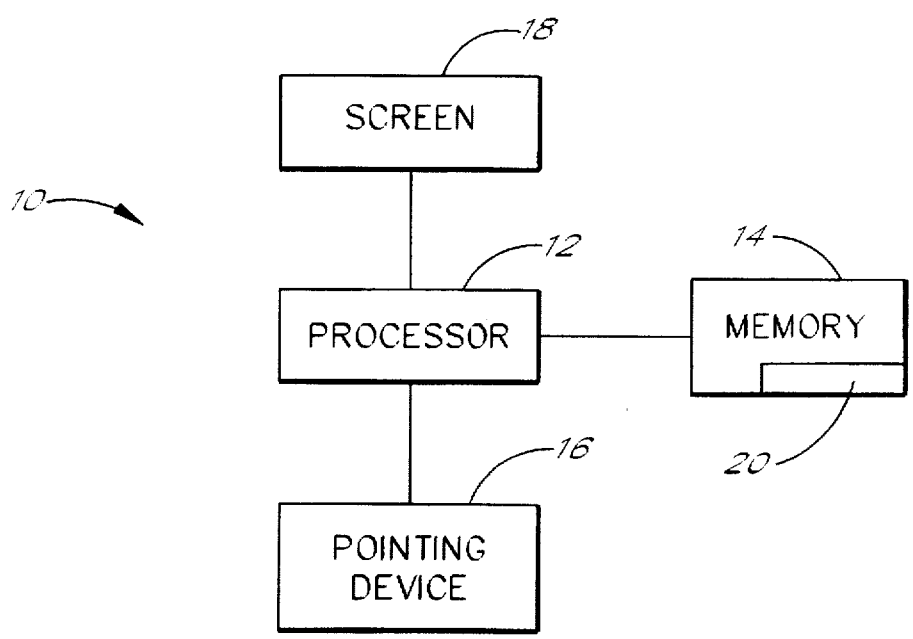
FIG. 3 is a block diagram of a preferred embodiment of the system of the present invention.

In a preferred embodiment, as shown in FIG. 3, a system of the present invention for detecting screen hotspots is implemented as a typical computer system 10 comprising a processor 12, a memory 14 for connection to the processor 12, a pointing device 16 for connection to the processor 12, and a screen 18 for connection to the processor 12. The memory 14 contains an operating system program that allows the computer system 10 to display a graphical user interface (GUI) on the screen 18. A pointing device 16 is used to select various hotspots on the screen 18 by positioning a cursor 48 (as shown in FIG. 8) over a specific pixel within a window view displayed on the screen 18, the coordinate of the pixel being generally referred to as x,y, where x,y define a location within the window view.

In addition, the memory 14 comprises a mask database 20. This mask database 20 comprises mask coordinate information for every hotspot available for use by the GUI. Each mask defines the valid coordinates for the corresponding hotspot, and each mask is given a reference number. When the pointing device 16 positions the cursor 48 on a specific pixel within the window view displayed on the screen 18, the coordinates x,y of that pixel are processed by the processor 12 to determine whether that pixel coordinate is a valid coordinate for any of the various hotspots, and whether such a valid hotspot is enabled.

In a preferred embodiment, the system and method for detecting screen hotspots is used in a diagnostics program. The diagnostics program graphically represents components of the computer system 10, and a user of the diagnostics program is able to explore the orientation and configuration of various components of the computer system 10 by manipulating graphical representations of various computer system components.

Figure 8:
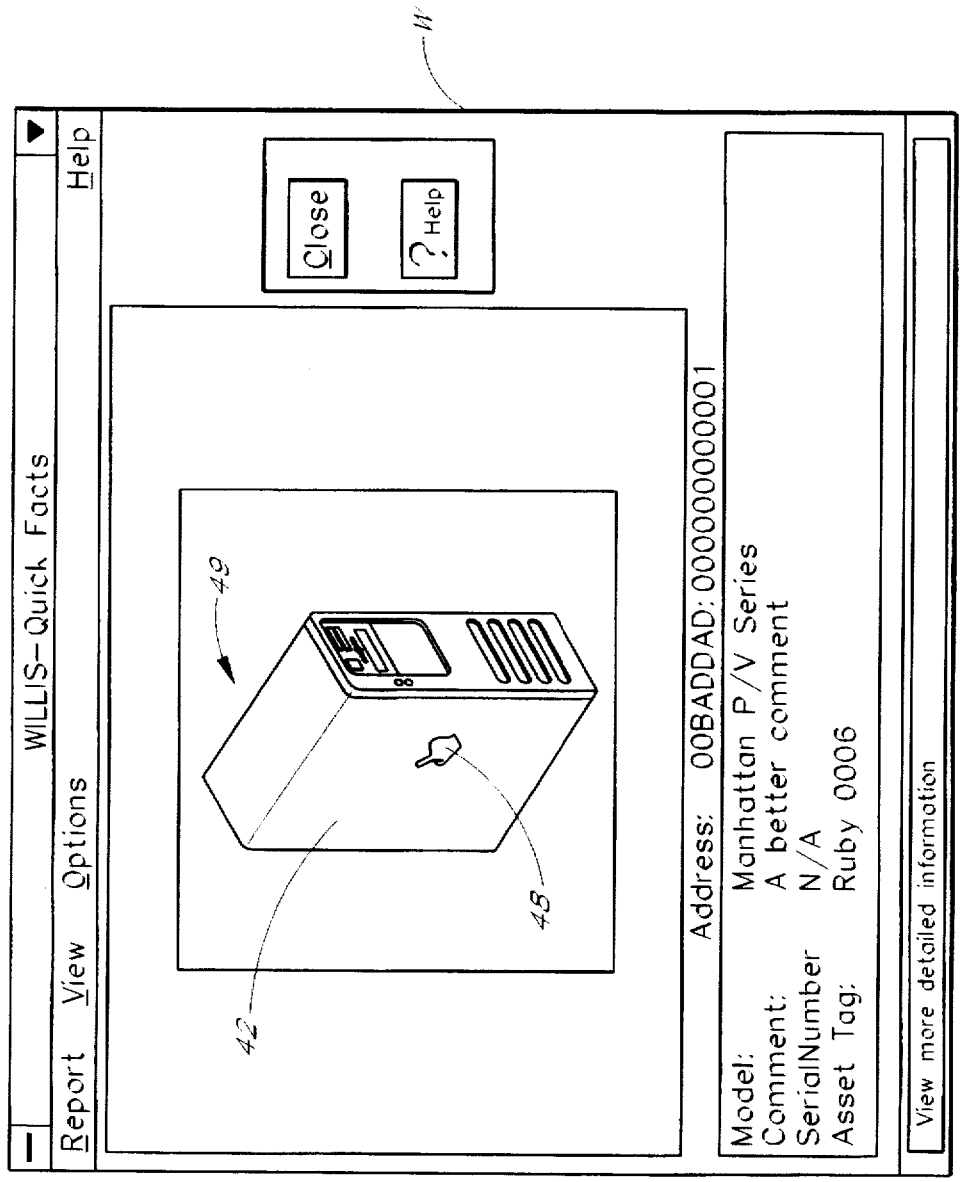
FIG. 8 is an illustration of a realistic graphical view of computer system components, with a cursor pointing to a graphical representation of a computer system cover.
Figure 9:
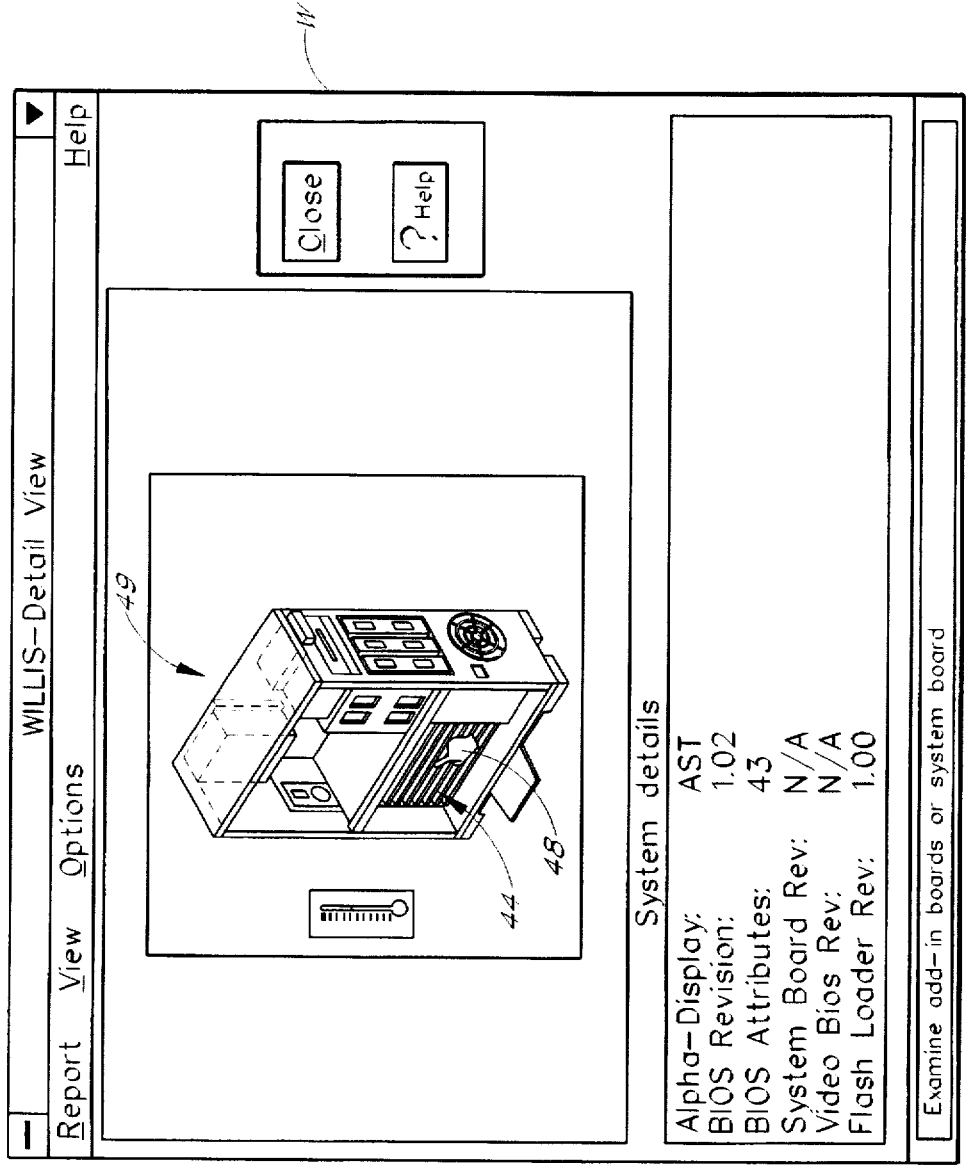
FIG. 9 is an illustration of a realistic graphical view of computer system components, with the cursor pointing to a graphical representation of a plurality of circuit cards connected to a motherboard.
Figure 10:
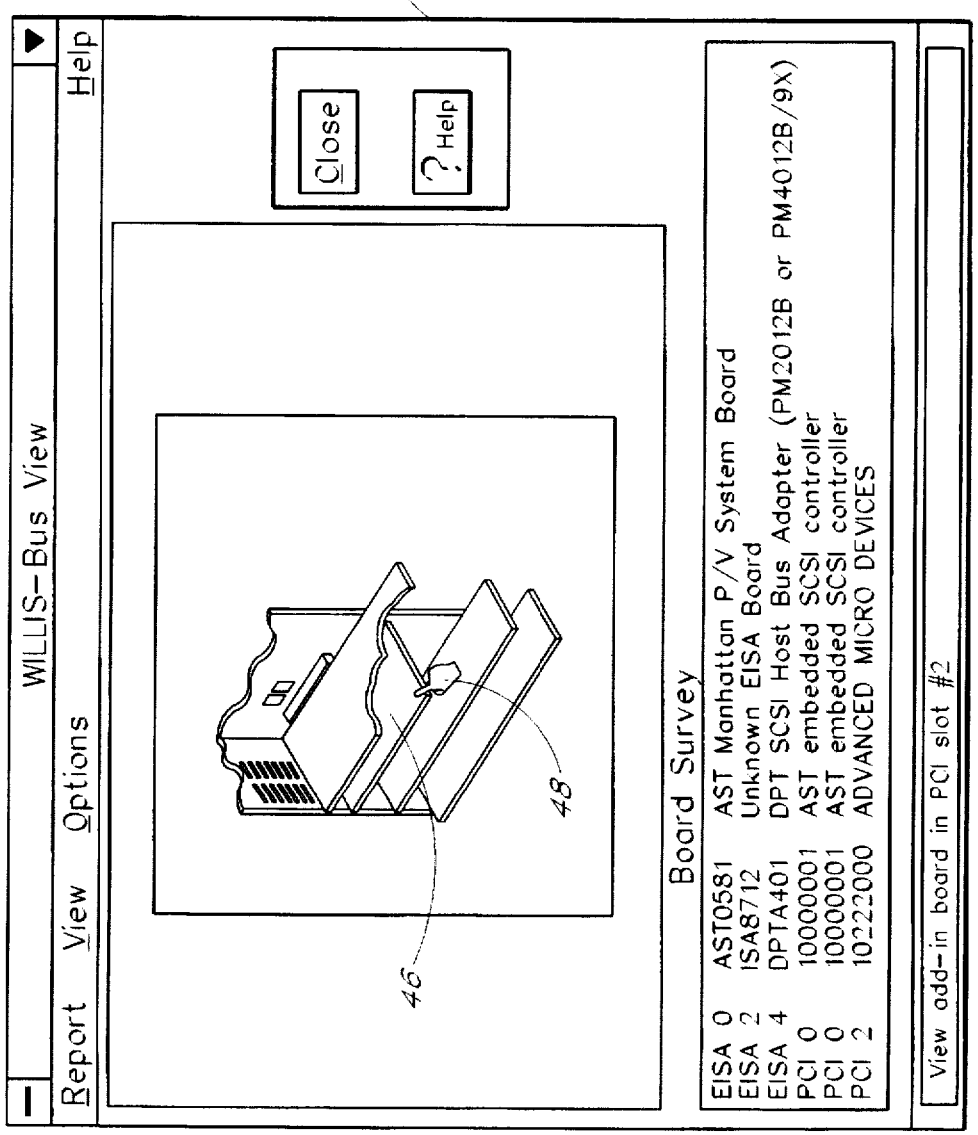
FIG. 10 is an illustration of a realistic graphical view of computer system components, with the cursor pointing to a graphical representation of a specific circuit card.

For example, the user can remove a graphical representation of a computer system cover 42 (as shown in FIG. 8)

by pointing-and-clicking on the computer system cover 42. The display then provides a graphical representation of the internal components of the computer system (as shown in FIG. 9), and particular components can be selected for closer inspection by pointing-and-clicking on the appropriate hotspot representing a particular component (as shown in FIGS. 9 and 10).

By providing a realistic image of the computer system 10 as it actually exists, the user becomes familiar with the orientation and configuration of the computer system components before actually removing the computer system's cover 42. This visual familiarity reduces the possibility of error when the user physically handles various components for the first time. Thus, a diagnostic program depicting a realistic graphical representation of computer system components is perfectly suited for implementing the system and method of the present invention for detecting screen hotspots comprised of complex shapes with multiple colors.

Rather than using rectangular coordinates or singular colors to define the screen hotspots, a monochrome bitmap, or mask, is created for each individual hotspot in each window view, with the black pixels in each monochrome bitmap having the same corresponding coordinates as the graphically represented object being displayed on the screen 18. Every pixel in a specific mask that correlates to the specific hotspot represented by an object on the screen 18 is black, and defined as valid. All other pixels are white, and defined as invalid. In this manner, every pixel of an object within the window view displayed on the screen 18, regardless of shape and regardless of color, is defined by the corresponding mask as valid. These masks are stored in the mask database 20.

Figure 4:
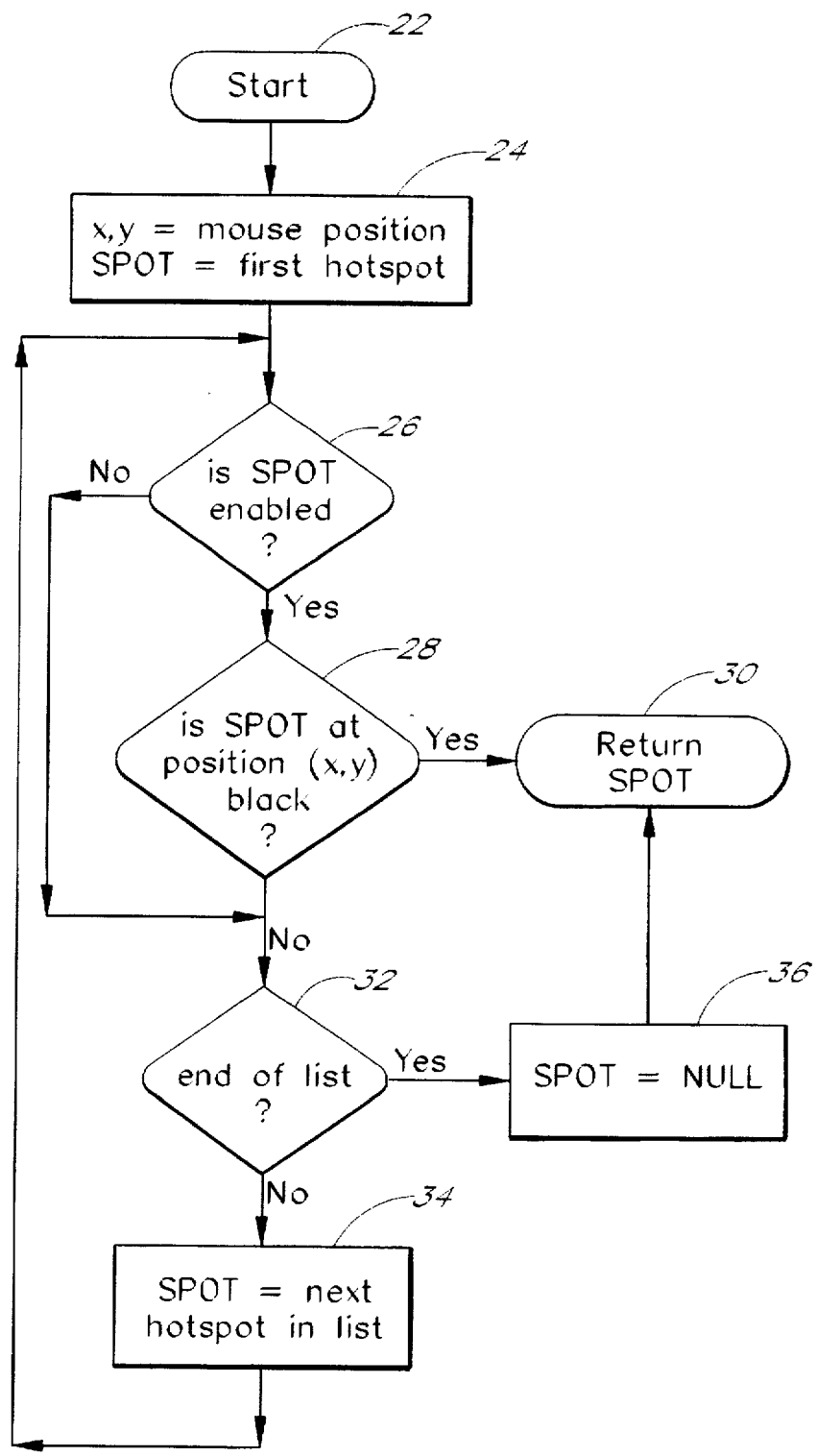
FIG. 4 is a flowchart illustrating the operation of the hotspot mask detection routine.

As shown in FIG. 4, the routine for detecting a valid coordinate in a mask that corresponds to a hotspot begins with Start 22. First, the present location of the cursor 48 is initialized as x,y, where x and y represent the coordinates of the pixel that the cursor 48 is pointing to, and the variable referred to as SPOT is initialized as the first hotspot 24. The first hotspot is defined by its corresponding mask, and provides valid coordinate information for comparison to the present cursor coordinates. Since the system 10 must determine whether x,y is a valid coordinate for any hotspot, the system systematically checks through every mask in the mask database 20 and compares the present coordinates of the cursor at x,y with the valid coordinates of each hotspot mask until a match is found.

The first question is whether the particular SPOT is enabled 26. This question is posed because not every hotspot is displayed on the screen 18 at any given time. It does no good to determine whether coordinate x,y is a valid coordinate for the first hotspot, if the first hotspot is not presently displayed on the screen 18. Since the user can only point-and-click on a hotspot presently displayed on the screen 18, if the first hotspot is not enabled, then the next question asked 32 is whether there are any more hotspots to consider. If the SPOT that was just considered is the last hotspot mask in the mask database 20, then that signifies that coordinates x,y are not valid for any hotspot masks, and therefore, the cursor must be pointing to a non-interactive region within the window view displayed on the screen 18. If this is the case, then the routine indicates this fact by defining SPOT equal to null. Thus, if the user points-and-clicks on this pixel, there is no response.

If the first hotspot is enabled, then the question is asked whether the x,y coordinates of the present location of the cursor 48 is a valid pixel for that hotspot 28. If it is a valid pixel, then the routine indicates this fact by defining SPOT equal to the first hotspot 30, such that pointing-and-clicking on this pixel will select the first hotspot.

If x,y is not a valid coordinate, then the routine asks whether there are any more hotspots to consider 32. If other hotspots remain, then SPOT is incremented to the next hotspot 34 in the mask database 20. In this example, SPOT is then reinitialized as the second hotspot and then returns to 26 and the question is asked whether the second hotspot is enabled. From here, the routine follows the steps as described above, with the flow of the routine depending upon the answer to the question. The variable SPOT is incremented and reinitialized as the next hotspot until all the hotspots are tested, or until there is a match between the present pixel coordinates of the cursor 48 and a particular hotspot.

The computer system 10 implements the method of the present invention for detecting screen 18 hotspots through the use of the mask database 20 which stores valid coordinate information on every mask generated for every hotspot in every possible window view for screen 18 display. Each mask for each hotspot is assigned a reference number, such as first hotspot, second hotspot, etc. The prioritized designation of these reference numbers are important when used to determine whether or not a particular hotspot overlaps another hotspot.

Figure 5B:
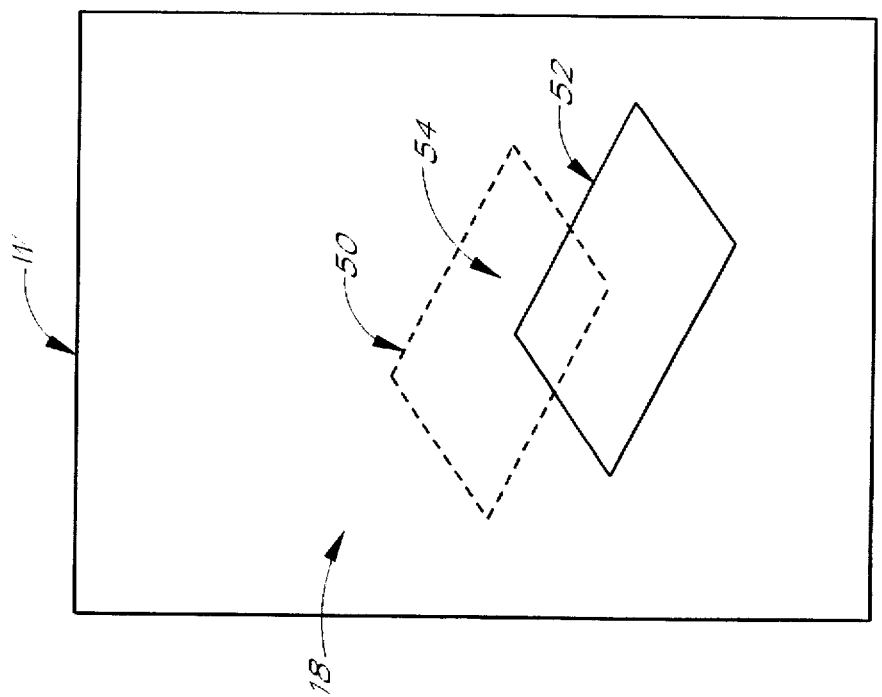
FIGS. 5a and 5b illustrate a perspective view of a graphical representation of a top circuit card and a bottom circuit card displayed in a window view, with the top circuit card overlapping a region of the bottom circuit card.
Figure 5A:
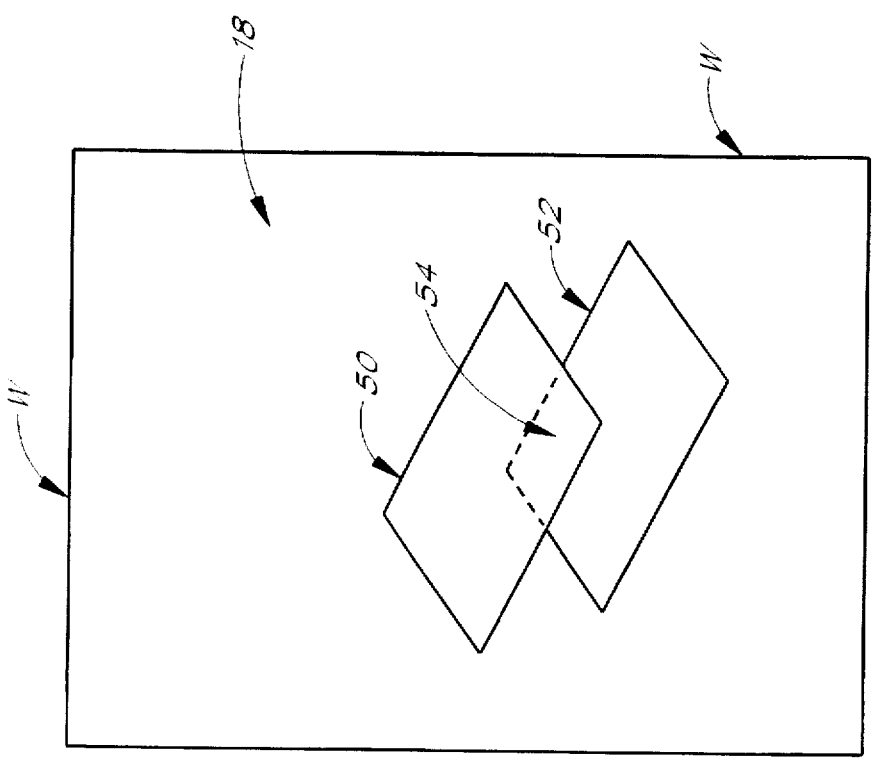

As an illustrative example, assume two circuit cards are installed in the computer system 10, and a graphically representative display of the computer system 10 provides a perspective view, as displayed in a window W, of certain internal components such that a top circuit card 50 defined by a first hotspot overlaps a portion of a bottom circuit card 52 defined by a second hotspot, as shown in FIGS. 5(a) and 5(b). On the screen 18, where window views are displayed in two dimensions, the coordinates that define this overlapping region 54 are valid coordinates for both the first and second hotspot. Therefore, a priority system must be implemented that assigns reference numbers to these overlapping hotspots based upon the relative position of each hotspot. In this way, the routine ensures that the presence of an upper-layer hotspot is always checked for enablement first, before proceeding to a lower-layer hotspot.

For example, if the top circuit card 50 is presently being displayed as a hotspot on the screen 18, then pointing-and-clicking on the overlapping region 54 of the two hotspots selects the top circuit card 50, since the top circuit card 50 is on top of the bottom circuit card 52 in that overlapping region 54, as shown in FIG. 5(a). However, if the top circuit card 54 is removed from the window W view displayed on the screen 18 (to visually represent the actual removal of the top circuit card 50, as shown in FIG. 5(b) wherein the top circuit card 50 is shown in phantom), and the cursor is still positioned on this overlapping region 54 of the two circuit cards, the system must be informed that since the top circuit card 50 is no longer being displayed, the bottom circuit card 52 is to be selected. This is accomplished when the routine determines whether or not the top circuit card 50 is enabled. Since the top circuit card 50 was removed, the routine determines that the top circuit card 50 is disabled.

The routine then checks the next hotspot, as determined by their reference numbers. The routine takes the next hotspot, in this case, the second hotspot, and checks to see if the second hotspot corresponding to the bottom circuit card 52 is enabled. If it is, then pointing-and-clicking on the pixel located in this valid overlapping region 54 of the two circuit cards selects the first enabled hotspot, which happens to be the second hotspot in this example.

Now, assume that both circuit cards are removed, both physically and graphically (not shown). The ability for the computer system 10 to detect the insertion or removal of certain computer components is known in the art, and is not discussed further herein. The computer system 10 indicates this change by disabling both the first and second hotspots. Now, assuming again that the cursor 48 is pointing to the coordinate x,y within the window W view in the overlapping region 54 that is a valid coordinate for both cards, the routine checks to see if the top circuit card 50 is valid by questioning whether the first hotspot is enabled. If it is not, it checks to see if the next card, or the second hotspot, is valid. If it is not, then it checks to see if there are any more hotspots for which this coordinate is valid. If there are none, then the system realizes that there are no hotspots presently being displayed at the present cursor location, and therefore, pointing-and-clicking on a pixel in that overlapping region 54 creates no response and selects nothing.

Having discussed the operation of the hotspot mask detection routine, the following section describes a preferred implementation of such a routine.

Figure 6:
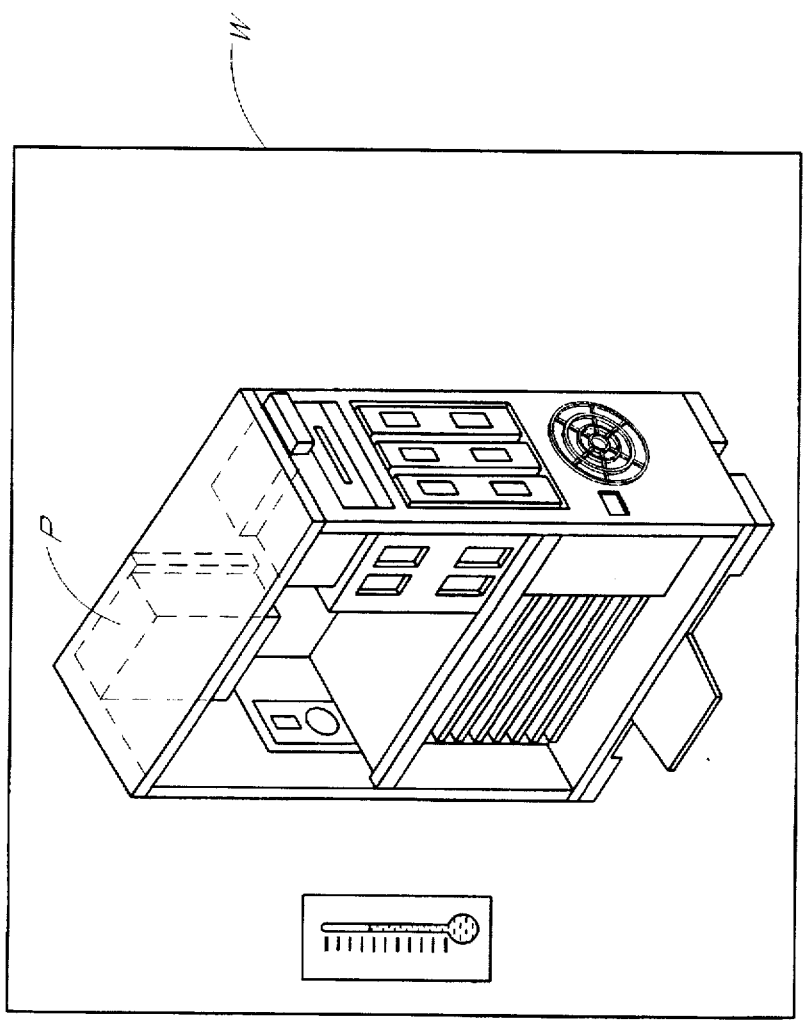
FIG. 6 is an illustration of a realistic graphical view of computer system components with the graphical representation of the computer system cover removed.

An example of a realistic window W view comprising a plurality of hotspots represented by complex shapes and multiple colors is shown in FIG. 6. One advantage of being able to use multiple colors for graphically representing a single hotspot is the ability to use just one color for multiple hotspots. For example, since most circuit cards are green, a realistic view displays these circuit cards as being green. This is not possible if different colors have to be used for adjacent hotspots.

Figure 7:
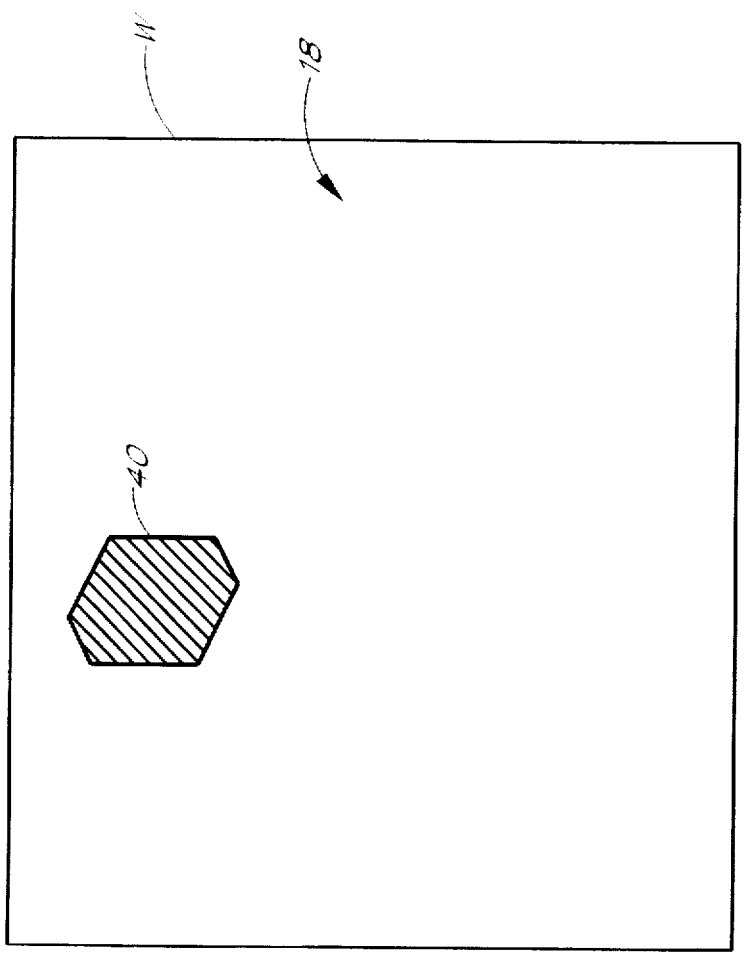
FIG. 7 is an illustration of a mask corresponding to the hotspot that is defined by the graphical representation of a power supply in the computer system.

Located in an upper internal portion of the computer system 10, as shown in FIG. 6, is a power source P. The valid coordinates of the hotspot represented by the illustration of the power source is defined by a mask, as shown in FIG. 7. The view as shown in FIG. 6 and the mask as shown in FIG. 7 both relate to the same window W such that there is a one-to-one correspondence of pixels between the two windows W shown in FIGS. 6 and 7. The black area 40 of the mask corresponds directly to the graphical representation of the power supply P as shown in FIG. 6. When the cursor 48 is pointing to a pixel that is defined as valid for a particular mask, the system and method of the present invention for detecting hotspots makes the determination that the cursor 48 is pointing to an interactive screen hotspot, and selects the corresponding screen 18 object.

Figure 11:
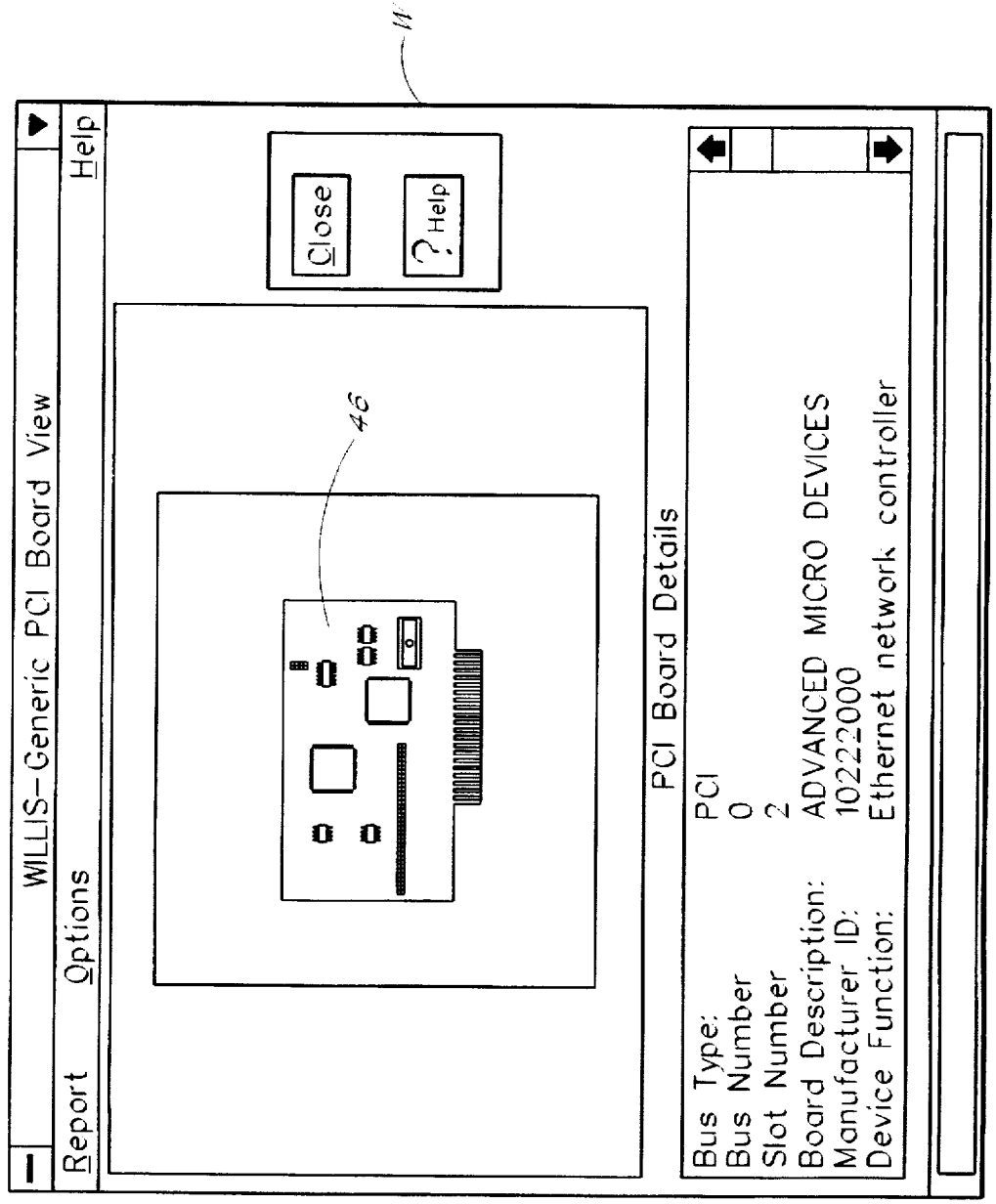
FIG. 11 is an illustration of a realistic graphical view of computer system components, with a graphical representation of the specific circuit card.

A preferred embodiment of the system of the present invention implements a diagnostics program. The diagnostic program enables a user to monitor and analyze various computer system components. For example, a window W view displays a graphical representation of a main housing unit 49 of a computer system, as shown in FIG. 8. This computer system may be the computer system 10 itself, or it may be a remote computer system that is in communication with the computer system 10, as would be the situation in a network configuration. The user removes the cover 42 from the main housing unit 49 of the computer system where the processor 12 and memory 14 are typically located, as shown in FIGS. 8 and 9, by pointing-and-clicking on the graphical representation of the computer system cover 42. The user then points-and-clicks on a plurality of circuit cards 44, as shown in FIG. 9, in order to focus in on individual circuit cards. The user then points-and-clicks on a specific individual circuit card 46, as shown in FIG. 10, to select that circuit card 46 for addition analysis. FIG. 11 provides detailed information about the specific individual circuit card 46 that was selected by the user, as graphically shown in FIGS. 8–10.

If it is determined that this card 46 needs to be replaced, repaired, or removed for whatever reason, then when the user actually goes to the computer system 10 represented by the window W views displayed on the screen 18 to access the specific card 46, the user's visual familiarity with the orientation of the components helps reduce errors. In other words, if the graphical representation of the computer system components are realistic, then the user is less likely to make a mistake when examining the real computer. If the graphical representation of the computer system components is comprised of rectangular shapes, with various single colored components, then the user's actual look inside the computer system will be an unfamiliar experience.

APPENDIX A comprises relevant portions of source code for a diagnostics program implementing the method of the present invention for detecting screen hotspots, and is incorporated into the specification by reference.

While the above description contains many specificities, these should not be construed as limitations on the scope of the invention, but rather as an exemplification of preferred embodiments thereof. Many other variations are possible. For example, the concepts of the hotspot mask, while described in conjunction with a diagnostics program, are equally adaptable to a number of different applications that benefit from the use of screen hotspots that are graphically represented by complex shapes and multiple colors. This system and method is efficiently implemented, and thus may also be used when simple shapes, or complex shapes with single colors, are being used to graphically represent screen hotspots. It is to be understood that the terminology used herein is such that a graphical representation of an object displayed on the screen defines a hotspot, and a hotspot defines a graphical representation of an object displayed on the screen, as well. Furthermore, it is to be understood that enabling a hotspot is equivalent to enabling a mask corresponding to the hotspot.

```
09/29/1994  16:32     Filename: DYNAPIX.CPP                                        Page 1

////////////////////////////////////////////////////////////////////////////////
//  File:   $Workfile:: DYNAPIX.CPP $ - Dynamicly updating pictures             //
//                                                                              //
//  Facilities for dynamicly updated imagery in infoPanes for Ruby.             //
//                                                                              //
//  Note - This is specific to MS/Window 3.x and Inmark's zApp.                 //
//                                                                              //
//  Copyright (C) 1994 by AST Research, Inc.                                    //
//                                                                              //
//  By dash                                                                     //
//                                                                              //
//  Functions: (List of included functions)                                     //
////////////////////////////////////////////////////////////////////////////////
//  $Log:: /chief/src/DYNAPIX.CPP                                              $//
//                                                                              //
//  10    9/19/94 5:44p Dash                                                   //
//  Changed to use aTempOstrstream for formatting output.                       //
//                                                                              //
//  9     9/16/94 3:43p Dash                                                   //
//  Changed code using NULL as zero - Borland 4.02 more sensitive to this.     //
//                                                                              //
//  8     9/02/94 4:25p Dash                                                   //
//  Changed GDI resource scheme - sips much more lightly from the GDI segment. //
//                                                                              //
//  7     8/22/94 5:31p Dash                                                   //
//  Speeded up refreshing by buffering display.                                 //
//                                                                              //
//  6     8/22/94 10:15a Dash                                                  //
//  Moved dynaPix functionality from anInfoPaneBase to class aDynaPane.        //
//                                                                              //
//  5     8/19/94 10:00a Dash                                                  //
//  Beefed up "bitmap not monochrome" exception message - now mentions bitmap  //
//  name and ID.                                                                //
//                                                                              //
//  4     8/18/94 5:52p Dash                                                   //
//  Various cleanups, more error checking.                                      //
//                                                                              //
//  2     8/17/94 4:55p Dash                                                   //
//  Further implementation changes.                                             //
//                                                                              //
//  1     8/15/94 6:46p Dash                                                   //
//  Dynamic picture updater member functions.                                   //
//                                                                              //
////////////////////////////////////////////////////////////////////////////////
// Environment: Ruby/Windows3.x/zApp                                           //
//////////////////////////////////////////////////////////////////////////////// include "prefix.h"

pragma warn -use
static char *dogtag = "$Header: /chief/src/DYNAPIX.CPP 10    9/19/94 5:44p Dash $";
pragma warn .use aDynaPic::aDynaPic( aDlBitmap *p,
                    char *maskName,
                    zDisplay *d,
                    int id,
                    aHotSpotter *u,
                    boolean enab )
 : mask(new zBitmap( zResId( maskName ))),
   pix(p),
   enabled(enab),
   stateChange(false),
   disp(d),
   id_(id),
```

```
09/29/1994  16:32     Filename: DYNAPIX.CPP                                        Page 2 user_(u),
   bitmapName(maskName)
{
   // We will copy the bitmap bits to a memory array for scanning.
   // 1st, calculate array memory requirements. Each row must be
   // an even # of words. Each pixel requires a byte. So the size
   // is (width rounded to 16bits
   if( mask->size() == 0 ) {
      aTempOstrstream s;
      s << "aDynaPic - Unable to load mask \""
        << maskName << "\"." << ends;
      throw aDynaPicException( s );
   } unsigned long bmSize = mask->size().width() * mask->size().height();
   BITMAP bitmap;
   if( GetObject( *mask, sizeof( bitmap ), &bitmap ) == sizeof( bitmap )) {
      bmSize = bitmap.bmWidthBytes * bitmap.bmHeight;
   } else {
      throw aDynaPicException, "aDynaPic: GetObject failed." );
   }
   // Make sure this is a monochrome bitmap. Throw exception if not
   if( bitmap.bmPlanes != 1 || bitmap.bmBitsPixel != 1 ) {
      delete mask;
      aTempOstrstream s;
      s << "aDynaPic - Bitmap specified for mask #" << ID() << ", resource \""
        << maskName << "\" is not a monochrome bitmap" << ends;
      throw aDynaPicException( s );
   } unsigned char *mapData;
   try { mapData = new unsigned char[bmSize]; }
   catch( xalloc &x ) {
      aTempOstrstream s;
      s << "aDynaPic: memory allocation ("
        << x.requested()
        << " bytes) failed." << ends;
      throw aDynaPicException( s.str() );
   } if( GetBitmapBits( *mask, bmSize, mapData )) {
      // Calculate picture origin by finding upper-left corner of image
      int row, col;
      unsigned char *ptr;
      for( row = 0, ptr = mapData;
           row < bitmap.bmHeight;
           row++, ptr += bitmap.bmWidthBytes ) {
         if( scanRowForBlack( ptr, bitmap.bmWidth )) {
            pixOrigin.y() = row;
            break;
         }
      } for( col = 0; col < bitmap.bmWidth; col++ ) {
         if( scanColumnForBlack( mapData + col / 8,
                                 col,
                                 bitmap.bmHeight,
                                 bitmap.bmWidthBytes )) {
            pixOrigin.x() = col;
            break;
         }
      }
   } delete[] mapData;
}
```

*Appendix A*

*A1*

```
09/29/1994  16:32      Filename: DYNAPIX.CPP                     Page 3 define ALL_WHITE   (0xff)

//
// Search the specified row in the monochrome bitmap for black pixels
// Return true if any found.
//
int aDynaPic::scanRowForBlack( unsigned char *ptr, int pixelLength )
{
    int retVal = 0;
    int wordLength = pixelLength / 8;
    unsigned char mask = ALL_WHITE >> (pixelLength % 8);

for( int i = 0; i < wordLength; i++ )
        if( (retVal = (*ptr++ != ALL_WHITE)) != 0)
            break;

// If no black found AND partial byte left, check partial for black pixels
    // Check for left over pixels at the end of the scanline
    if( !retVal && mask != ALL_WHITE )
        retVal = (*ptr | mask) != ALL_WHITE;

return retVal;
}

//
// Search the specified column in the monochrome bitmap for black pixels
// Return true if any found.
//
int aDynaPic::scanColumnForBlack( unsigned char *ptr,
                                  int column,
                                  int numRows,
                                  int wrap )
{
    // Build the columns select mask
    unsigned char mask = (1 << (7 - (column % 8)));
    int retVal = 0;

for( int row = 0; row < numRows; row++, ptr += wrap )
        if( (retVal = ((*ptr & mask ) == 0)) != 0 )
            break;

return retVal;
} zRect aDynaPic::getArea()
{
    zRect r;
    if( picture() )
        r = zRect( origin(), origin() + zPoint( picture()->size().width(),
                                                picture()->size().height()));
    return r;
} void aDynaPic::render( zDisplay *disp )
{
    if( isEnabled() && picture() ) {
        disp->lock();

// save background color, then change to WHITE
        zColor oldBackC = disp->backColor();
        disp->backColor( zColor( 255, 255, 255 ));

// Don't know why this zApp call doesn't work... substituting equivalent
```

```
09/29/1994  16:32      Filename: DYNAPIX.CPP                     Page 4

// Windows API call.
        disp->bitmap( mask, zPoint( 0, 0 ), mask->size(), SRCAND );
        zBitmapDisplay tempCanvas( mask );
        BitBlt( *disp,
                pixOrigin.x(), pixOrigin.y(),
                pix->size().x(), pix->size().y(),
                tempCanvas,
                pixOrigin.x(), pixOrigin.y(),
                SRCAND );

pix->copyTo( disp, pixOrigin, pix->size(), SRCPAINT );

disp->backColor( oldBackC );
        disp->unlock();
        stateChange = false;
        tempCanvas.setBitmap( NULL );
    }

//
    // Enabling a mask causes several things to happen:
    //  1) When the mouse is over it, the cursor changes shape
    //  2) "    "    "   "    "    ", the status line has help displayed
    //  3) "    "    "   "    "    ", and left mouse button clicks, user->hit()
    //  4) If an image is associated with this hotspot, it is displayed
    //
    void aDynaPic::enableMask( boolean enab )
    {
        if( enabled != enab ) {
            enabled = enab;
            stateChange = true;
            if( picture() )
                canvas()->setDirty( &getArea(), FALSE );
        }
    } aDynaPic::~aDynaPic()
    {
        delete mask;  // maskCanvas will delete this when it goes
    }

///////////////////////////////////////////////////////////////////
    // Constructor for an info pane. Optionally builds list of dynaPics and
    // images.
    //
    aDynaPane::aDynaPane( zWindow* w,
                          zSize* siz,
                          zResId backgroundID,
                          aMaskInitRecord *m,
                          anImageInitRecord* images,
                          aHotSpotter *user )
        : zPane( w, siz ),
          backdrop( backgroundID ),
          backdropTo( backgroundID ),
          defaultUser( user ),
          imageBuff( NULL )
    {
        canvas()->lock();
        try {
            imageBuff = new zBitmap( backdrop()->size().width(),
                                     backdrop()->size().height(),
                                     canvas() );
            if( images ) {
                for( anImageInitRecord *iPtr = images; !(iPtr->eol); iPtr++ )
```

```
09/29/1994 16:32        Filename: DYNAPIX.CPP                                    Page 5 imageList += new anImage( iPtr->resID, iPtr->id );
    }
    if( m ) {
        aMaskInitRecord *rPtr;
        for( rPtr = m; !rPtr->eol; rPtr++ ) {
            try {
                dynaPicList &= new aDynaPic( imageList[rPtr->imageID],
                                             rPtr->maskName,
                                             canvas(),
                                             rPtr->requestedID,
                                             defaultUser,
                                             rPtr->enabled );
            }
            catch( aDynaPic::aDynaPicException &x ) {
                x.reportError();
            }
        }
    }
    buildBuffer();
    canvas()->unlock();
}
catch( aDynaPic::aDynaPicException &e ) {
    canvas()->unlock();
    e.reportError();
}

// GetHitID - Examine the active masks. If any enabled mask is black at
// point p, return the ID associated with that mask.  Return -1 if no enabled
// mask is black at point p.
//
int aDynaPane::getHitID( zPoint p )
{
    int retval = -1;

if( maskList().head() ) {
        zColor black( 0, 0, 0 );
        zBitmapDisplay disp( *maskList().head());
        for( anImageMaskList::iterator it( maskList()); it(); it++ ) {
            if( it()->isEnabled()) {
                disp.setBitmap( *it());
                if( disp.pixel( p ) == black ) {
                    retval = it()->ID();
                    break;
                }
            }
        }
        disp.setBitmap( NULL ); // Prevent zBitmapDisplay from auto-deleting bitmap
    }
    return retval;
} aDynaPane::~aDynaPane()
{
    delete imageBuff;
}
//
```

```
09/29/1994 16:32        Filename: DYNAPIX.CPP                                    Page 6

// Create the display buffer. This consists of loading the DIB from resource,
// then merging in any enabled imagery. We assume that any previous buffer
// has been deleted at this point.
//
void aDynaPane::buildBuffer()
{
    // Load DIB
    aDIBitmap backdrop( backdropID );

// If no buffer, create one.
    if( !buffer )
        buffer = new zBitmap( backdrop()->size().width(),
                              backdrop()->size().height(),
                              canvas());

// ... and apply DIB to buffer
    zBitmapDisplay tempCanvas( &imageBuffer());
    backdrop()->copyTo( &tempCanvas );

// Merge in any enabled dynaPics. Iterate through list backwards.
    for( aDynaPicList::iterator it( dynaPicList, toTail ); it(); it-- )
        it()->render( &tempCanvas );

tempCanvas.setBitmap( NULL );
} int aDynaPane::draw( zDrawEvt* )
{
    DBG_DB_VERBOSE, ("\n%s::draw: ", typeid(*this).name() ));
    canvas()->lock();

// Firstly, find out if any masks have changed state. If any have,
    // we need to regenerate our bitmap/buffer
    boolean anyChanged;
    for( aDynaPicList::iterator it( dynaPicList ); it(); it++ )
        anyChanged |= it()->stateHasChanged();

if( anyChanged )
        buildBuffer();      // Yes, imagery is different. Regenerate buffer zRect damageArea;
    canvas()->getDirty( damageArea );

zBitmapDisplay temp( &imageBuffer() );
    temp.copyTo( canvas(),
                 damageArea.left(), damageArea.top(),
                 damageArea.width(), damageArea.height(),
                 damageArea.left(), damageArea.top() );
    temp.setBitmap( NULL ); // To prevent automatic deletion of our bitmap canvas()->unlock();

return 1;
}
//                                                  End of $Workfile:: DYNAPIX.CPP    $
```

```
09/23/1994  15:14        Filename: DASHLIST.CPP                                  Page   1

//////////////////////////////////////////////////////////////////////////////
//   File:    Workfile:: DASHLIST.CPP $ - General doubly-linked list.       //
//                                                                          //
//   Implements a double-linked list.  Provides a base class template for   //
//   links and a list template.  Also defines some exceptions for lists     //
//   to use.                                                                //
//                                                                          //
//   Copyright (C) 1994 by AST Research, Inc.                               //
//                                                                          //
//   By dash                                                                //
//                                                                          //
//   Functions: (list of included functions)                                //
//////////////////////////////////////////////////////////////////////////////
//  $Log: /chief/src/DASHLIST.CPP                                           $
//                                                                          //
//   7    9/01/94 5:43p Dash                                                //
//   Moved dogtags below includes - caused header database re-precompilation.//
//                                                                          //
//   6    9/01/94 9:42a Dash                                                //
//   Updated headers.                                                       //
//////////////////////// Environment: Ruby/Windows3.x/zApp ////////////////// ifdef BUILDING_LIBRARY
include <iostream.h>
# include <stdlib.h>
# include <cstring>
# include <except.h>
# include <typeinfo.h>
  pragma hdrstop
# include "db.h"
# include "dashlist.h"
#else
# include "prefix.h"
endif pragma warn .use
static char *dogtag = "$Header: /chief/src/DASHLIST.CPP 7    9/01/94 5:43p Dash $";
pragma warn .use aLinkedListExceptionBase::aLinkedListExceptionBase( string &s )
: reason( s )
{} string &aLinkedListExceptionBase::Why()
{
    return reason;
} aDListBase::anIterBase::anIterBase( aDListBase &b, listResetLocation loc )
: list(b)
{
    reset( loc );
} void aDListBase::anIterBase::stepForward()
{
    if( current_ ){
        if( !atEnd() )
            current_ = current()->nextItem();
        else
```

```
09/23/1994  15:14        Filename: DASHLIST.CPP                                  Page   2 current_ = NULL;
    }
} void aDListBase::anIterBase::stepBackward()
{
    if( current_ ){
        if( !atHead() )
            current_ = current()->previousItem();
        else
            current_ = NULL;
    }
}

// Insert before specified this.
void aDListBase::insert( aDLinkBase *i )
{
    if( i == NULL )
        throw aLinkedListException<aDListBase>( "aDLinkBase::insert(NULL)" );

i->next_ = this;
    i->previous_ = previous_;
    previous_->next_ = i;
    previous_ = i;
} void aDListBase::insertBefore( aDLinkBase *i, aDListBase *b )
{
    if( b == NULL )
        throw aLinkedListException<aDListBase>(
            "Bad argument(s) to aDListBase::insertBefore()" );

b->insert( i );
    count++;
} ifdef BASE_SORTED_INSERT
// Insert in ascending order.  Only really works if all items in list
// are in sorted order.  Assumes
void aDListBase::sortedInsert( aDLinkBase *i )
{
    anIterBase it(*this);
    aDLinkBase *ptr;

// Find 1st item greater than this one.  Failing that, append to list
    while( !it.atEnd() ){
        ptr = it.current();
        if( *i < *ptr )
            break;
        it.stepForward();
    } if( ptr ) // Found if ptr != NULL
        insertBefore( i, ptr );
    else
        append( i );
}
endif void aDListBase::insert( aDLinkBase *i )
{
```

```
09/23/1994  15:14      Filename: DASHLIST.CPP                                Page 3 if( !i )
        throw alinkedListException<aDListBase>( "aDListBase::insert( NULL )" );
    if( last ) {
        i->next_ = last->next_;
        i->previous_ = last;
        last->next_->previous_ = i;
        last->next_ = i;
    } else
        last = i->next_ = i->previous_ = i;
    count++;
} void aDListBase::append( aDLinkBase *a )
{
    insert( a );
    last = last->nextItem();
} void aDListBase::purge( sentence kill )
{
    while( kill && last )
        remove( last, kill );
} void aDListBase::remove( aDLinkBase *togo, sentence kill )
{
    if( !togo || !togo->next_ || !togo->previous_ )
        throw aDListBase::remove passed bad aDLinkBase" );
    if( !last )
        throw( "aDListBase::remove invoked for empty list." );
    // Handle trivial case of list with one item
    if( last == last->next_ ) {
        last = NULL;
    } else {
        if( last == togo )
            last = togo->previous_();
        togo->next_->previous_ = togo->previous_;
        togo->previous_->next_ = togo->next_;
    }
    --count;
    if( kill )
        delete togo;
} aDListBase::~aDListBase()
{
    purge( kill );
} ifdef STANDALONE_TEST
/////////////////////////////////////////////////////////////
#ifdef SIMPLE_CLASS
class aTestClass : public aSortableaDLink<aTestClass> {
public:
    int value;
    aTestClass( int i ) { value = i; }
```

```
09/23/1994  15:14      Filename: DASHLIST.CPP                                Page 4 int operator << ( aTestClass &x ) {
        return value < x.value;
    }
};
#else
class aTestClass : public aSortableDLink<aTestClass> {
    friend class aTestClassList;
private:
    int id_;
    string name_;
public:
    typedef aSortedDList<aTestClass>::iterator iterator;
    int ID() { return id_; }
    string &name() { return name_; }
    aTestClass( int i, string s ) :
        id_(i), name_(s)
    {}
    int operator<(aTestClass &x ) { return name() < x.name(); }
};
endif aTestClass::aTestClass( int i, string s )
: id_(i), name_(s)
{} class aTestClassList : public aSortedDList<aTestClass> {
public:
    aTestClass *operator[]( string s );
    aTestClass *operator[]( int i );
};

aTestClass *aTestClassList::operator[]( string s ) {
    return dlistFind( *this, s, &aTestClass::name_ );
} aTestClass *aTestClassList::operator[]( int i ) {
    return dlistFind( *this, i, &aTestClass::id_ );
}

// Control test inclusion
//
#define DO_ITERATION_TEST
//#define RUNAWAY_TEST
//#define NULL_INSERTION_TEST
#define search_test
void main()
{
    aTestClass *ptr;
    int i = 5;
    cout << endl << "list here." << endl;
    aTestClassList *list = new aTestClassList;
    aTestClassList::iterator it( *list );

for( i = 0; i < 3; i++ ) {
        list->append( new aTestClass( i * 7 ));
    }
    cout << "Inserting 5 as 2nd element " << endl;
    ptr = list->head()->nextItem();
    list->insertBefore( new aTestClass( 5 ), ptr );

list->append( new aTestClass( 123, "Willis" ));
    cout << "Looking up Willis: " << endl;
    ptr = (*list)["Willis"];
    if( ptr == NULL )
        cout << "NOT FOUND." << endl;
    else
```

```
cout << "Item found, id:" << ptr->ID() << endl;
cout << "Looking up 123: " << endl;
ptr = (*list)[123];
if( ptr == NULL )
    cout << "NOT FOUND." << endl;
else
    cout << "Item found, id:" << ptr->name() << endl;

#ifdef RUNAWAY_TEST
i = 0;
it.reset();
while( (ptr = it()) != NULL ) {
    cout << "item: " << ptr->value << endl;
    i++;
    if( i > 6 ) {
        cout << endl << "Runaway loop halted." << endl;
        break;
    }
}
endif // RUNAWAY_TEST cout << "SortedInserting 10" << endl;
list->insert( new aTestClass( 10 ));

#ifdef NULL_INSERTION_TEST
try {
    list->insert( NULL );
}
catch( aLinkedListExceptionBase &ex ) {
    cout << endl << "Caught exception, type \""
         << typeid(ex).name()
         << "\",\ncomplaint: \"" << ex.why() << "\", " << endl;
}
catch( xmsg &m ) {
    cout << endl << "Caught xmsg exception, \"" << m.why() << "\"." << endl;
}
endif // NULL_INSERTION_TEST ifdef LOOP_TEST
cout << "Test loop, forward from head." << endl;
for( ptr = list->head(); ; ptr = ptr->nextItem() ) {
    cout << "item: " << ptr->value << endl;
    if( list->isLastItem( ptr ))
        break;
};
cout << "Test loop, backward from tail." << endl;
for( ptr = list->tail(); ; ptr = ptr->previousItem()) {
    cout << "item: " << ptr->value << endl;
    if( list->isFirstItem( ptr ))
        break;
};
endif ifdef DO_ITERATION_TEST
cout << "Iteration test." << endl;
i = 0;
cout << "Iterating forward: " << endl;
for( it.reset(); it(); it++ )
    cout << "item: " << it()->ID() << endl;
cout << "Iterating backward: " << endl;
for( aTestClassList::iterator bit( *list, total ); bit(); bit-- )
    cout << "item: " << bit()->ID() << endl;
cout << "Iteration test finished." << endl;
```

```
#endif
    delete list;
    cout << "done." << endl;
}
endif
// ............. End of $Workfile:: DASMLIST.CPP $
```

```
09/23/1994  15:14        Filename: INFO_WIN.CPP                                      Page  1
////////////////////////////////////////////////////////////////////////////////
//     File:  $Workfile:: INFO_WIN.CPP $ - Member functions for anInfoWinBase //
////////////////////////////////////////////////////////////////////////////////
// anInfoWinBase is the base class for all infoWins - template infoWin        //
// inherits from this.  AnInfoWinBase encapsulates the main graphic,          //
// dialog, menu, status line and the buttons Close, Nexp and Prev.            //
//                                                                            //
// Note - This is specific to MS/Window 3.x and Inmark's zApp.                 //
//                                                                            //
// Copyright (C) 1994 by AST Research, Inc.                                   //
//                                                                            //
// By D. Shively 11 (dash)                                                    //
// Edit history:                                                              //
// Who     Date         Comment                                               //
// ----    --------     -----------                                           //
// Dash    2/15/94      Inception                                             //
// $Log:: /chief/src/INFO_WIN.CPP                                          $  //
//                                                                            //
// 11     9/23/94 12:13p Dash                                                 //
// Added anUpdateImagerBase member functions.                                 //
//                                                                            //
// 10     9/19/94 5:14p Dash                                                  //
// Removed the setNotifyKilled that was made on anInfoDlg.  Removed deletion  //
// of pane  from ~anInfoWinBase().                                            //
//                                                                            //
// 9      9/16/94 3:44p Dash                                                  //
// Changed code using NULL as zero - Borland 4.02 more sensitive to this.     //
//                                                                            //
// 8      8/18/94 5:54p Dash                                                  //
// Implemented dynaPic dynamic imagery code.                                  //
//                                                                            //
// 7      8/03/94 2:10p Dash                                                  //
// Modified anImageMask to hold a pointer to aHotspotter, who gets "hit"      //
// whenever the mouse button goes up over the hotspot.  Also updated headers.//
////////////////////////////////////////////////////////////////////////////////  Environment: Ruby/Windows3.x/zApp //
//////////////////////////////////////////////////////////////////////////////// include "prefix.h"

pragma warn -use
static char *dogtag = "$Header: /chief/src/INFO_WIN.CPP 11   9/23/94 12:13p Dash
$";
pragma warn .use define FRAME_STYLE  (WS_OVERLAPPED  | \
                                                  WS_CAPTION
                      |  \
                      WS_SYSMENU     | \
                      WS_DLGFRAME    | \
                      WS_MINIMIZEBOX  }

//#define DO_COUNTING_WINDOWS
#ifdef DO_COUNTING_WINDOWS
unsigned int aCountingWindow::count = 0; // Count of open windows
aCountingWindow::aCountingWindow()
{
   ++aCountingWindow::count;
```

```
09/23/1994  15:14        Filename: INFO_WIN.CPP                                      Page  2 aCountingWindow::~aCountingWindow()
{
   if( --aCountingWindow::count == 0 )
      app->quit();
}
#else
unsigned int anInfoWinBase::count = 0; // Count of open windows
endif boolean anInfoWinBase::helpOn = 0; // Init static HelpOn flag ifdef USE_IMAGE_MASK
anImageMask::anImageMask( char *name,              // bitmap name in resource
                          int xtrolID,             // menu/button control ID
                          zDisplay *pDisp,         // zDisplay for this hotspot
                          aHotspotter *hs,         // alerted on hits (may be NULL)
                          boolean en )             // enabled/disabled flag
 : enabled( en ), id(xtrolID), bitmapName(name), user_(hs);
{
   zBitmap *bMap = new zBitmap( zResId( name ));

if( bMap ). {
      if( (disp = new zBitmapDisplay( pDisp, bMap )) == NULL )
         throw xmsg( "anImageMask couldn't create zBitmapDisplay." );
   } else
      throw xmsg( string("anImageMask couldn't load bitmap ") + name );
} anImageMask::~anImageMask()
{
   delete canvas();
}
endif

//typedef aDList<anImageMask>::iterator anImageMaskListIterator;

//////////////////////
//  aListMgrBase stuff //
//////////////////////
#ifdef LIST_MGR
aListMgrBase::aListMgrBase( zListBox *lb, anIdentity &id )
 : list_(lb),
   theInk(NULL),
   ID(id)
{} aListMgrBase::~aListMgrBase()
{}
endif anInfoWinBase::anInfoWinBase( zWindow *parent,
                              anIdentity &id,
                              char *caption,
                              zResId imageID,
                              char *newMenu,
                              aMaskInitRecord *maskInitData,
                              anImageInitRecord *imageInitList )
 : anIndividual(id),
   BorDialogFrame( parent,
```

```
09/23/1994 15:14    Filename: INFO_WIN.CPP                              Page 3 new zSizer(0, 0, DEFAULT_WIDTH, 400 ),  // <<<<<<< DEBUG KLUDG
  FRAME_STYLE,
  caption ? caption : "" ),
sline(0),
spotter(0),
dialog(0),
pane_(0),
waiter_(0),    // For menuHandler()
mouseIsCaptured(false)
{
  try {
    backgroundColor(GetSysColor(COLOR_BTNFACE));

char *menuName = newMenu ? newMenu : "id_infoWinMenu";
    zMenu *tempMenu = new zMenu( this, zResId( menuName ));
    if( !tempMenu->id() ) {
      ostrstream sstr;
      sstr << typeid(*this).name()
           << " couldn't load menu \""
           << menuName << "\"" << ends;
      throw anInfoWinException( string( sstr.str()));
    }
    menu( tempMenu );
    //
    //op: added SecurityOpt and Help to menu
    //
    menu()->setCommand(this, (CommandProc)&anInfoWinBase::optMenuSecuri
rity,                                                     id_optMenuSecu
ty);
    menu()->setCommand(this, (CommandProc)&anInfoWinBase::helpMenu,
                               id_helpMenu, id_helpContents);

sline=new StatusLine( this, new zGravSizer( ZGRAV_BOTTOM, 0, sizer()));
    sline->show();
    sline->setupHiLite( menu() );

dialog = new anInfoDlg( this, zResId( "id_infoDlg" ));
    dialog->closeButton->setNotifyClicked(             (ClickProc)&anInf
owinBase::ok );
    dialog->helpButton->setNotifyClicked (this,
                        (NotifyProc) &anInfoWinBase::HelpBtnProc);
//  dialog->setNotifyKill( this, (NotifyProc)&anInfoWinBase::ok );
                     this,
                     (NotifyProc)&anInfoWinBase::listB
    List()->setNotifyDoubleClick(
oxDoubleClick );
    dialog->show();

// Adjust window size to exactly contain the dialog and status line
    zRect dlgSize;
    dialog->getExterior( dlgSize );
    zRect intSize, extSize;
    getInterior( intSize );
    getExterior( extSize );
    zDimension intExtDiff( extSize.size().x() - intSize.size().x(),
                           extSize.size().y() - intSize.size().y() );

zRect newSize( extSize );

newSize.right()  = newSize.left() + ( dlgSize.width() + intExtDiff.x() ) +
    newSize.bottom() = newSize.top() +
```

```
09/23/1994 15:14    Filename: INFO_WIN.CPP                              Page 4 sline->sizer()->rect().height() +
                            dialog->sizer()->rect().height() +
                            intExtDiff.y();
    if( newSize.height() > sizer()->height()
        || newSize.width() > sizer()->width())
      zDialogFrame::move( newSize );

// If a valid resource id was passed for the image,
    // create anInfoPane for it
    if( strcmp( imageID.id(), "" ) != 0 ) {
      pane( new anInfoPaneBase( &dialog->pictureFrame(),
                                new zGravSizer(
                                     0,
                                     dialog->pictureFrame().size()),
                                ZGRAV_CENTER,
                                this,
                                imageID,
                                maskInitData,
                                imageInitList ));

if( pane() ) {
        if( maskList().itemCount() ) {
          pane()->setNotifyMouseButtonUp(
                         this,
                         (NotifyProc)&anInfoWinBase::paneMouseButtonUp);
          pane()->setNotifyMouseMove( this,
                         (NotifyProc)&anInfoWinBase::paneMouseMove
);
        }
        pane()->show();
      } deleteOnClose( TRUE );

position = new aPosition( ID, this );
      position->restore( this );

setHandler( this,              (NotifyProc)&anInfoWinBase::palet
teChanged,                          WM_PALETTECHANGED );

setHandler( this,              (NotifyProc)&anInfoWinBase::query
NewPalette,                         WM_QUERYNEWPALETTE );

setHandler( this,              (NotifyProc)&anInfoWinBase::palet
teIsChanging,                       WM_PALETTEISCHANGING );

++count;
    }
    catch( anInfoPaneBase::badNews &news ) {
      // Clean up and re-throw
      delete waiter_;
      delete dialog;
      delete pane_;
      delete spotter;
      if( masks ) {
        anImageMask *temp;
        while(( temp = masks->remove()) != 0 )
          delete temp;
        delete masks;
      }
```

```
09/23/1994  15:14      Filename: INFO_WIN.CPP                    Page  5

//      delete sline;
        DBG( DB_NORM, ("anInfoWinBase: Caught exception - rethrowing...\n"
  }) ;
        throw;
   }
} anInfoPaneBase *anInfoWinBase::pane( anInfoPaneBase *newPane )
{
        anInfoPaneBase *retVal = pane();

//      if( pane() && maskList().itemCount() ) {
//              pane()->setNotifyMouseButtonUp(
//                      this,
//                      (NotifyProc)&anInfoWinBase::mouseButtonUp
//              );
//              pane()->removeNotifyMouseMove(this, (NotifyProc)&anInfoWinBase::m
ouseMove);
//      } pane = newPane;
//      if( pane() && maskList().itemCount() ) {
//              pane()->setNotifyMouseButtonUp(
//                      this,
//                      (NotifyProc)&anInfoWinBase::paneMouseButtonUp);
//              pane()->setNotifyMouseMove( this,
//                      (NotifyProc)&anInfoWinBase::paneMouseMove );
//      } if( pane())
                pane()->show();

return retVal;
} anInfoWinBase::~anInfoWinBase()
{
        menu()->removeCommand( this,                    (CommandProc)&a
nInfoWinBase::optMenuSecurity );
        menu()->removeCommand( this,                    (CommandProc)&a
nInfoWinBase::helpMenu );
        if (helpOn && (count==1))
                WinHelp((unsigned int) parent(), "", HELP_QUIT,0);

removeHandler( this,
                                (NotifyProc)&anInfoWinBase::palet
teChanged,
                                WM_PALETTECHANGED );

removeHandler( this,
                                (NotifyProc)&anInfoWinBase::query
NewPalette,
                                WM_QUERYNEWPALETTE );

removeHandler( this,
                                (NotifyProc)&anInfoWinBase::paletteIschan
ging,
                                WM_PALETTEISCHANGING );

delete waiter;
//      delete pane( NULL );
```

```
09/23/1994  15:14      Filename: INFO_WIN.CPP                    Page  6 if( dialog ) {
                List()->removeNotifyDoubleClick(
                        this,
                        (NotifyProc)&anInfoWinBase::listBoxDoubleClick );
                dialog->closeButton->removeNotifyClicked(
                        this,
                        (ClickProc)&anInfoWinBase::okButton );
                dialog->removeNotifyKill( this, (NotifyProc)&anInfoWinBase::ok );
                delete dialog;
        }

//      delete spotter;

//      if( masks ) {
//              anImageMask *temp;
//              while(( temp = masks->remove()) != 0)
//                      delete temp;
//              delete masks;
//      } delete sline;
        if( --count == 0 )
                app->quit();
} int anInfoWinBase::paletteChanged( aPaletteChangeEvent *ev )
{
        if( pane()) {
                if( ev->windowHandle() == *this || ev->windowHandle() == *pane())
                        return 0;
                else
                        if( pane()->palette()->select(pane()->canvas()) != 0 )
                                updateColors( *pane()->canvas());
                pane()->setDirty();
        }
        return 0;
} int anInfoWinBase::queryNewPalette( aPaletteChangeEvent * )
{
        if( pane() && pane()->palette()->select(pane()->canvas()) != 0 )
                pane()->setDirty();
        return 1;
} int anInfoWinBase::paletteIsChanging( aPaletteChangeEvent *ev )
{
        if( pane() && ev->windowHandle() != *this && ev->windowHandle() != *pane() )
                pane()->setDirty();
        return 0;
} int anInfoWinBase::exit( zNotifyEvt * )
{
        anIDManager::shutdownAll((id).agentAddress());
        app->quit();
        return 1;
}
```

```
09/23/1994 15:14      Filename: INFO_WIN.CPP                              Page 7 int anInfoWinBase::move( zMoveEvt * )
{
    if( position )
        position->update( this );

return 1;
} int anInfoWinBase::activate( zActivateEvt *ev )
{
#ifdef DO_CAPTURE_MOUSE
    if( !ev->active() ) {
        if( pane() && mouseIsCaptured ) {
            pane()->releaseMouse();
            mouseIsCaptured = false;
        }
        sline->blank();
    }
#else
    if( !ev->active() )
        sline->blank();
#endif
    return 1;
} anUpdateManagerBase::anUpdateManagerBase( anInfoWinBase *w )
: win(w),
  nodeList_(NULL)
{
} anUpdateManagerBase::~anUpdateManagerBase()
{
    delete nodeList_;
}

//
// Default function for base class of anUpdateManager<T>
//
void anUpdateManagerBase::silence()
{
    nodeList()->silence();
}

// ----------------- End of $workfile:: INFO_WIN.CPP    $ -----------------
```

```
09/23/1994 15:14         Filename: INFO_PAN.CPP                                          Page 1
//////////////////////////////////////////////////////////////////////////
// File:    $Workfile: INFO_PAN.CPP $ - Member functions for anInfoPaneBase//
//                                                                        //
// anInfoPaneBase contains the central graphi image for anInfoWin. (See   //
// info_win.h)                                                            //
// Note - This is specific to MS/Window 3.x and Inmark's zApp.            //
//                                                                        //
// Copyright (C) 1994 by AST Research, Inc.                               //
//                                                                        //
// By dash                                                                //
//                                                                        //
// Functions: (List of included functions)                                //
//   Dash    2/15/94    Inception                                         //
// $Log: /chief/src/INFO_PAN.CPP $                                        //
//                                                                      $ //
// 6     8/22/94 10:15a Dash                                              //
// Moved dynaPix functionality from anInfoPaneBase to class aDynaPane.    //
//                                                                        //
// 5     8/18/94 5:53p Dash                                               //
// Updated header.  Implemented dynaPic support in infoPane.              //
//                                                                        //
////////////////// Environment: Ruby/Windows3.x/zApp ///////////////////// include "prefix.h"

pragma warn -use
static char *dogtag = "$Header: /chief/src/INFO_PAN.CPP 6     8/22/94 10:15a Dash $";
pragma warn .use //
// Constructor for an info pane.  Optionally builds list of dynaPics and
// images.
//
anInfoPaneBase::anInfoPaneBase( zWindow* w,
                                zGravSizer *siz,
                                anInfoWinBase *iw,
                                zResId backgroundID,
                                zMaskInitRecord *m,
                                anImageInitRecord* images )
  : aDynaPane( w, siz, backgroundID, m, images, iw ),
    owner_(iw)
{
  // Adjust our sizer to match the size of the background bitmap.
  if( backdrop() ) {
    siz->useArea( backdrop()->size() );
    siz->dimension( backdrop()->size() );
    siz->affinity( ZGRAY_CENTER );
    siz->parent()->update();
  }
} anInfoPaneBase::~anInfoPaneBase()
{
} void anInfoPaneBase::adjustParent( zWindow *p, zDimension &d )
{
  zRect pInt;
  boolean doMove(false);

p->getInterior( pInt );
```

```
09/23/1994 15:14         Filename: INFO_PAN.CPP                                          Page 2 zRect newSize;
  p->getExterior( newSize );

if( pInt.width() < d.width()) {
    doMove = true;
    newSize.right() = newSize.left() + ( d.width() - pInt.width() );
  }
  if( pInt.height() < d.height()) {
    doMove = true;
    newSize.bottom() = newSize.top() + ( d.height() - pInt.height() );
  }
  if( doMove )
    p->move( newSize );
} int anInfoPaneBase::size( zSizeEvt* ev )
{
  zWindow::size( ev );
  setDirty();

return 0;
} int anInfoPaneBase::mouseMove( zMouseMoveEvt *ev )
{
// Support for DO_CAPTURE_MOUSE clause dropped early '94.  Kept here for
// historic reasons - we may need to do something like this again someday.
// - dash
#ifdef DO_CAPTURE_MOUSE
  if( pane() ) {
    if( mouseIsCaptured.isFalse() ) {
      pane()->captureMouse();
      mouseIsCaptured = true;
      sline->hiliteID( getHitID( *ev ));
    } else {
      if( pane()->sizer()->rect().contains( *ev ))
        sline->hiliteID( getHitID( *ev ));
      else {
        pane()->releaseMouse();
        mouseIsCaptured = false;
        sline->blank();
      }
    }
  }
#else
  int id = getHitID( *ev );
  owner()->statusLine().hiliteID( id );
  if( id == -1 )
    setCursor( zCursor(Arrow));
  else
    setCursor( zCursor(zResId( "id_cursorHand")));
#endif
  return 0;
}

// If the mouse was over an enabled hotspot when the left button came up,
// AND a hotspotter is registered for this hotspot, then call the user's
// hit() function.
int anInfoPaneBase::mouseButtonUp( zMouseClickEvt *ev )
```

```
09/23/1994  15:14      Filename: INFO_PAN.CPP                               Page  3 if( !ev->isButton( 2 )) {    // 2 is the left button; make sure it's UP
        int id;
        aHotSpotter *user;
        if((id = getHitID( *ev )) != -1 &&
            ( user = maskList()[ id ]->user()) != NULL ) {
            zCursor previousCursor = cursor();
            setCursor( zCursor( Hourglass ));
            user->hit( id );
            setCursor( previousCursor );
        }
    }
    return 0;
}

//------------------- End of SWorkfile:: INFO_PAN.CPP  $ ------------------
```

```
09/23/1994  15:11        Filename: INFO_WIN.H                                  Page   1
///////////////////////////////////////////////////////////////////////////////
// File:    $Workfile:: INFO_WIN.H    $ - Class definitions for infoWins.
///////////////////////////////////////////////////////////////////////////////
// anInfoWin is a visual construct used in the Chief, a subsystem of project
// Ruby. Please see the EDS for the Chief for operational details.
// anInfoWin encapsulates the graphics and dialogs required for this
// operation. The sub-window displaying the central graphic is further
// defined in anInfoPane. The dialog sub-window managing the listbox,
// listbox header and buttons defined in class anInfoPane. Management of
// bitmaps representing image hotspots is handled by the classes anImageMask
// and aMaskInitRecord. Default handling for standard menus is defined in
// aMenuHandlerBase (See infomenu.h). Class anUpdateManager is provided to
// allow specific handling up data update events. Most of the time this will
// be updating line items in the list box, and changing the contents of static
// text strings and window captions.
//
// Note - This is specific to MS/Window 3.x and Inmark's zApp.
//
// Copyright (C) 1994 by AST Research, Inc.
//
// By dash
///////////////////////////////////////////////////////////////////////////////
// Who     Date             Comment
// ---     ----             -------
// Dash    1/11/94          Inception
// Dash    4/23/94          Got rid of defaultflavour, change unit to uDWord.  $
// $Log:: /chief/include/INFO_WIN.H
//
// 17    9/23/94 3:06p Dash
// Moved most of anUpdateManager<T>'s functionality into new base class
// anUpdateManagerBase. This reduces the size of the updateManagers, and
// makes updateManager functionality available to theMenuHandlerBase.
//
// 16    9/19/94 5:12p Dash
// Added activeWindowCount() member function to class anInfoWinBase.
//
// 15    8/22/94 10:15a Dash
// Moved dynaPix functionality from anInfoPaneBase to class aDynaPane.
//
// 14    8/18/94 5:42p Dash
// Changed infoWin hotspot exception class to derivation of anExceptionBase.
// Replaced old hotspot subsystem with dynaPic - windows can now dynamicly
// update their imagery by associating imagery with hotspots and selectively
// enabling them.
//
// 13    8/05/94 6:12p Dash
// Fixed bug: was using DEBUG(..) instead of DB(..).
//
// 12    8/03/94 2:10p Dash
// Modified anImageMask to hold a pointer to aHotSpotter, who gets "hit"
// whenever the mouse button goes up over the hotspot. Also updated headers.
/////////////////////////////////////// Environment: Ruby/Windows3.x/zApp // ifndef INFO_WIN_H
define INFO_WIN_H class aDIBitmap;
class aPalette;

// Exception class for infoWindows.
class anInfoWinException : public anExceptionBase (
friend class anInfoWinBase;
protected:
```

```
09/23/1994  15:11        Filename: INFO_WIN.H                                  Page   2 anInfoWinException( string &why ) : anExceptionBase( why ) {};
};

class aPaletteChangeEvent : public zEvent (
public:
    HANDLE windowHandle() ( return parm1(); )
};

class aPictureFrame : public zButton (
public:
    aPictureFrame( zFrameWin *, int );
    ~aPictureFrame();
};

//
// anInfoDlg - The dialog portion of anInfoWin. Contains the list box,
// buttons Close, Next, Prev and Exit, and static text list box heading.
//
class anInfoDlg : public BorDialogFrame (
friend class huge anInfoWinBase;
private:
    zDefPushButton *closeButton;    // Actually called "Close"
    zPushButton *helpButton;
    zListBox *list;
    zStaticText *listHeading;
    zGroupBox *pixFrame;
public:
    anInfoDlg( zWindow*, zResId& );
    ~anInfoDlg();

zGroupBox &pictureFrame() (
        return *pixFrame;
    )
    zStaticText *Heading() (
        return listHeading;
    )
    zListBox *list() ( return list; )
};

// image mask initialization record.
//
// anInfoPane contains the graphical imagery.
//
class anInfoPaneBase : public aDynaPane (
    // adjustParent alters the size of our parent window so that it is wide
    // enough to hold the dialog. Dialog width varies with screen resolulation
    // and font width.
    void adjustParent( zWindow *p, zDimension &d );
    anInfoWinBase *owner_;
    int size( zSizeEvt *ev );
    int mouseMove( zMouseMoveEvt * );
    int mouseButtonUp( zMouseClickEvt * );
public:
    // Exception class. See definition of xmsg in Borland/ANSI docs.
    class badNews : public anExceptionBase (
    friend anInfoPaneBase;
    private:
        badNews( string &why ) : anExceptionBase( why ) {};
    );
```

```
09/23/1994 15:11          Filename: INFO_WIN.H                              Page 3 aInfoPaneBase( zWindow* w,
            zGraySizer *siz,
            aInfoWinBase *iw,
            zResId backdrop,
            aMaskInitRecord *m =NULL,
            aImageInitRecord* images =NULL );

virtual ~aInfoPaneBase();

aInfoWinBase *owner() { return owner_; }
};

class aMenuHandlerBase; // forward declaration

///////////////////////////////////////////////////////////////
//// aCountingWindow - A window entity that keeps a count of it's
//// invocations. When the last one is deleted, the application is
//// terminated
class aCountingWindow {
private:
    static unsigned int count; // keeps count of windows - app->quit() when zero
protected:
    aCountingWindow();
    ~aCountingWindow();
};

///////////////////////////////////////////////////////////////
//// aInfoWinBase contains the image, status line, menu and dialog.
//
template<class T> class aViewMenuHandler;

class aUpdateManagerBase; // forward declaration

// Including aCountingWindow in the inheritence causes a GP fault when
// the mouse is moved of the graphic of aInfoWin<quickFacts>. It
// happens while traversing the image mask linked list.
// I DON'T THINK THIS SHOULD HAPPEN - dash
//class aInfoWinBase : public aCountingWindow,
class aInfoWinBase :
                    public BorDialogFrame,
                    public anIndividual,
                    public aHotSpotter {
    friend aViewMenuHandler<class T>;
private:
    static unsigned int count; // Keeps count of windows - app->quit() when zero
    aPosition *position;
    enum { DEFAULT_WIDTH = 525, DEFAULT_HEIGHT = 460 };
    aInfoPaneBase *pane_;       // Manages central graphic
    aHotSpotter *spotter;       // Receiver of hotspot calls
    aImageMaskList maskList;    // List of hotspot masks
    void buildMaskList( aMaskInitRecord* );
    StatusLine *sline;          // Status line. See visual.hpp, visual.cpp
    aInfoDlg *dialog;           // Defined above
    int exit( zNotifyEvt * );   // Called when exit button in dialog pressed
    boolean mouseIsCaptured;    // Flag indicating whether mouse is captured
    int activate( zActivateEvt * ); // Process Windows activation message
    int move( zMoveEvt * );     // Handle window move message
    int paletteChanged( aPaletteChangeEvent * ); // These functions process
    int queryNewPalette( aPaletteChangeEvent * ); // Windows palette update
    int paletteIsChanging( aPaletteChangeEvent * ); // messages
    aMenuHandlerBase *waiter;   // Waiters handle menus - get it?
    static boolean helpOn;      // Whether WinHelp was opened by the Chief 09/23/1994 15:11          Filename: INFO_WIN.H                              Page 4 protected:
        // infoPane accessors. 2nd flavor also replaces current pane with new one.
        aInfoPaneBase *pane() { return pane_; }
        aInfoPaneBase *pane( aInfoPaneBase *newPane );

aMenuHandlerBase *menuHandler() {
        return waiter_;
    }
    void menuHandler( aMenuHandlerBase *m ) {
        waiter_ = m;
    } zDefPushButton &okButton() { return *dialog->closeButton; } aInfoWinBase( zWindow *parent,
                    anIdentity &,
                    char *caption =NULL,
                    zResId image =NULL,
                    char *newMenu =NULL,
                    aMaskInitRecord * =NULL,
                    aImageInitRecord * =NULL );

public:
    virtual ~aInfoWinBase();
    StatusLine &statusLine() {
        return *sline;
    }
    void addStatusLineHelpText( int newID, const char *newText ) {
        statusLine().text( newID, newText );
    }
    // Get list of hotspot masks
    aImageMaskList &maskList() { return pane()->maskList(); }
    // Shortcut to finding a mask
    aImageMask *lookupMask( int id ) { return maskList()[id]; } int aInfoWinBase::optMenuSecurity( zCommandEvt *ce );
    int aInfoWinBase::helpMenu( zCommandEvt *ce );
    int aInfoWinBase::helpBtnProc( zNotifyEvt *ne );

// Expose "picture frame" groupBox in dialog
    zGroupBox &pictureFrame() {
        return dialog->pictureFrame();
    } virtual void awaken() {     // Default handling of awaken call
        show( SW_RESTORE );
        setFocus();
    } setImage( zResId );                             // changes central graphic
        setMasks( aMaskInitRecord * );                  // Same for masks zStaticText *Heading() {
            return dialog->Heading();
        }
        zListBox *List() {
            return dialog->List();
        }
        StatusLine *status();
#ifndef ENABLE_PURE_VIRTUAL
    virtual int ok( zNotifyEvt *ev ) {
        DB( DB_NORM, ("\nERROR: Pure virtual function called.\n    aInfoWinBase::o
    k( zNotifyEvt *ev )=0;"));
        return( 0 );
    };
```

```
09/23/1994 15:11     Filename: INFO_WIN.H                              Page 5 virtual int listBoxDoubleClick( zNotifyEvt * ev ) {
        DBG_DB_NORM, (""\nERROR: Pure virtual function called.\n" anInfoWinBase::l
istBoxDoubleClick( zNotifyEvt *ev )=0;"") );
        return( 0 );
      }
#else
      virtual int okt zNotifyEvt *ev ) =0;
      virtual int listBoxDoubleClick( zNotifyEvt * ) =0;
#endif
      static unsigned int activeWindowCount() {
        return count;
      }
};

class anAgentLink;   // See agntlink.hpp template<class T> class anUpdateManager;   // forward declaration //
// anInfoPane - Template for specific inforWin. Will occasionally be
// overridden to provide local functionality (like animating the central
// graphic)
template<class T>
class anInfoPane : public anInfoPaneBase {
public:
  anInfoPane( zWindow* w,
              zGravSizer *siz,
              zResId );

virtual int draw( zDrawEvt * );
  virtual int size( zSizeEvt * );
};

// Default template functions for anInfoPane<T> - handles functions implementor
// doesn't want to override.
//
template<class T>
int anInfoPane<T>::anInfoPane( zWindow* w, zGravSizer *siz, zResId id )
: anInfoPaneBase( w, siz, id )
{} template<class T>
int anInfoPane<T>::draw( zDrawEvt *ev )
{
  return anInfoPaneBase::draw( ev );
} template<class T>
int anInfoPane<T>::size( zSizeEvt *ev )
{
  return anInfoPaneBase::size( ev );
}

// anInfoWin - Template for specific infoWins. They come in various flavours.
//
```

```
09/23/1994 15:11     Filename: INFO_WIN.H                              Page 6 template<class T>
class anInfoWin : public anInfoWinBase {
  friend class aMenuHandlerBase;
private:
  anUpdateManagerBase *mgr;         // Local data handling goes here
  virtual int okt zNotifyEvt *ev );  // User input event handlers
  virtual int listBoxDoubleClick( zNotifyEvt *ev );
public:
  anInfoWin( anIdentity ID );
  ~anInfoWin();
  static anInfoWin *make( anASTSystem *sys, uDWord unit =0 );
  virtual void hit( int );    // Button click in graphic hotspot
  anUpdateManager<T> * manager() {
    return (anUpdateManager<T>*)mgr;
  }
  anInfoPane<T> *pane() {
    return (anInfoPane<T> *)anInfoWinBase::pane();
  }
  anInfoPane<T> *pane( anInfoPane<T> *newP ) {
    return (anInfoPane<T> *)anInfoWinBase::pane( newP );
  }
};

//
// Default destructor for anInfoWin
//
template<class T>
anInfoWin<T>::~anInfoWin()
{
  mgr->silence();
  delete mgr;
}

//  For taking pointers to makers of info-windows. See mgditems.h for exampl
e.
typedef void (*anInfoWinMake)( anASTSystem *, uDWord );
template<class T>
anInfoWin<T> *anInfoWin<T>::make( anASTSystem *sys, uDWord unit )
{
  anIdentity newID( sys, typeid(anInfoWin<T>).name(), unit );
  anIndividual *temp = anIDManager::iDB()->lookupID( newID );
  anInfoWin<T> *retVal = NULL;

if( temp == NULL ) {
    try { retVal = new anInfoWin<T>( newID ); }
    catch( anInfoWinException &uh_oh ) {
      uh_oh.victim( typeid( anInfoWin ).name() );
      uh_oh.reportError();
      retVal = NULL;
    }
  } else
    temp->awaken();

return retVal;
}
pragma warn .inl template<class T>
void anInfoWin<T>::hit( int )
```

```
09/23/1994  15:11       Filename: INFO_WIN.H                    Page  7 template<class T>
int anInfoWin<T>::listBoxDoubleClick( zNotifyEvt * ) { return 1; } class anItemList; // forward declaration

//
// anUpdateManagerBase - Base for template class anUpdateManager<T>
//
class anUpdateManagerBase {
private:
    anItemList *nodeList_;
    anInfoWinBase *win;
protected:
    anInfoWinBase *infoWin() { return win; }
    void infoWin( anInfoWinBase *newWin ) { win = newWin; } void nodeList( anItemList *newList ) { nodeList_ = newList; } anUpdateManagerBase( anInfoWinBase *w );

public:
    // Some short-cut accessors
    anIdentity &id() { return infoWin()->id(); }
    anASTSystem &system() { return infoWin().id().system(); }
    zListBox *listBox() { return infoWin()->listBox(); }
    anItemList *nodeList() { return nodeList_; }
    virtual void silence();
    virtual ~anUpdateManagerBase();
};

//
// anUpdateManager - A wholly private friend class of anInfoWin. Exists
// to manage updating of infoWin with server data. Override template to
// implement local functions
//
template<class T>
class anUpdateManager : public anUpdateManagerBase {
    friend class anInfoWin<T>;
protected:
    anInfoWin<T> *infoWin() {
        return (anInfoWin<T> *)anUpdateManagerBase::infoWin();
    }
    void infoWin( anInfoWin<T> *newWin ) {
        anUpdateManagerBase::infoWin( newWin );
    } anUpdateManager( anInfoWin<T> *w );
    virtual ~anUpdateManager();
public:
    // Some short-cut accessors
    anASTSystem &system() { return id().system(); }
    anAgentLink &link();
};

#ifndef BUILDING_LIBRARY
template<class T>
inline anAgentLink &anUpdateManager<T>::link() {
    return system().agentLink();
}
endif // Default constructor/destructors for anUpdateManager
//
```

```
09/23/1994  15:11       Filename: INFO_WIN.H                    Page  8 template<class T>
anUpdateManager<T>::anUpdateManager( anInfoWin<T> *w )
: anUpdateManagerBase( w )
{} template<class T> anUpdateManager<T>::~anUpdateManager() {} endif
// ----------------- End of $Workfile:: INFO_WIN.H          $
```

```
09/23/1994  15:11      Filename: DASHLIST.H                                    Page 1

///////////////////////////////////////////////////////////////////////////////
//  File:   $Workfile:: DASHLIST.H    $ - General doubly-linked list.       //
///                                                                         //
///  Implements a double-linked list.  Provides a base class template for links //
///  and a list template.  Also defines some exceptions for lists to use.   //
///                                                                         //
///  Copyright (C) 1994 by ASI Research, Inc.                               //
///                                                                         //
///  By dash                                                                //
///     Dash       1/11/94     Inception                                    $
///  $Log:: /chief/include/DASHLIST.H                                       $
///                                                                         //
///  4    9/01/94 9:42a Dash                                                //
///  Updated headers.                                                       //
///                                                                         //
///////////////////////////////  Environment: Ruby/Windows3.x/zApp          // ifndef DASHLIST_H
define DASHLIST_H enum listResetLocation ( toHead = 0, toTail = 1 );

///////////////////////////////////////////////////////////////////////////////
///                                                                         //
///  Define link exceptions.  All link exceptions derived from              //
///  aLinkedListExceptionBase, which inherits from xmsg.  See template      //
///  aLinkedListException below.                                            //
///                                                                         //
class aLinkedListExceptionBase (
private:
    string reason;
protected:
    aLinkedListExceptionBase( string &s );
public:
    virtual string &why();
);

// Linked list exception template.  A class should throw a derivation of
// this class, e.g. aLinkedListException<aDLinkBase>("problem")
template<class T>
class aLinkedListException : public aLinkedListExceptionBase (
public:
    aLinkedListException( string s );
);

// Constructor for above
template<class T>
aLinkedListException<T>::aLinkedListException( string s )
: aLinkedListExceptionBase( s ) ();

/////  aDLinkBase - base class for template class aDLink.  Provides most
/////              functionality
class aDLinkBase (
    friend class aDListBase;
private:
    aDLinkBase *next_;
    aDLinkBase *previous_;
protected:
```

```
09/23/1994  15:11      Filename: DASHLIST.H                                    Page 2 virtual -aDLinkBase() ();
    virtual -aDLinkBase() (
        next_->previous_ = previous_;
        previous_->next_ = next_;
    )
    aDLinkBase() ( next_ = previous_ = this; )

// Create a link, inserting before the specified link
    aDLinkBase( aDLinkBase *p ) (
        if( p == NULL )
            throw aLinkedListException<aDLinkBase>(
                "NULL passed to insertion constructor" );

next_ = p;
        if( (previous_ = p->previous_) != NULL )
            previous_->next = this;
        p->previous_ = this;
    )

void insert( aDLinkBase *i ); // insert i before this
public:
    aDLinkBase *nextItem() ( return next_; )
    aDLinkBase *previousItem() ( return previous_; )
);

template<class T>
class aDLink : public aDLinkBase (
public:
    T *nextItem()     ( return (T *)aDLinkBase::nextItem(); )
    T *previousItem() ( return (T *)aDLinkBase::previousItem(); )
);

template<class T>
class aSortableDLink : public aDLink<T> (
public:
#ifndef ENABLE_PURE_VIRTUAL
    virtual int operator <<( T& ) (
        DB( DB_WORM, ("\nERROR: pure virtual function called\n  aSortableDLink::
nt operator <( T& ) = 0;" ) );
        return( 0 );
    );
#else
    virtual int operator <<( T& ) =0;
#endif
);

enum sentence ( letlive = 0, kill );

///////////////////////////////////////////////////////////////////////////////
/////  aDListBase - Base for template class aDList<>.  Implements most of aDList's
/////              functions.  Also contains definition of list iterator.
///////////////////////////////////////////////////////////////////////////////
class aDListBase (
private:
    aDLinkBase *last;     // End of list.  last->next is head
    unsigned int count;
public:
    aDListBase() : count(0) ( last = NULL; )

// Bidirectional iterator for list.  Stops at end.
    // Note - will probably not survive deleting current().
    class anIterBase;
    friend anIterBase;
```

```
09/23/1994 15:11    Filename: DASHLIST.H                                Page 3 class aniterBase {
friend aDListBase;
private:
    aDListBase &list;
    aDLinkBase *current_;
public:
    aniterBase( aDListBase &b, listResetLocation loc );
    aDLinkBase *current() { return current_; }
    void stepForward();
    void stepBackward();
    void reset( listResetLocation loc ) {
        current_ = (loc == toHead) ? list.head() : list.tail();
    }
    int atEnd() { return list.isLastItem( current() ); }
    int atHead() { return list.isFirstItem( current() ); }
};

void insert( aDLinkBase * );                              // New list head
void insertBefore( aDLinkBase *i, aDLinkBase *b ); // Insert i before b
void append( aDLinkBase * );                              // New list tail
void remove( aDLinkBase *, sentence =letLive );    // Remove from list
void purge( sentence =letLive );                          // Remove all from list
int isLastItem( aDLinkBase *maybe ) { return maybe == tail(); }
int isFirstItem( aDLinkBase *maybe ) { return maybe == head(); }
aDLinkBase *head() { return last ? last->next_ : NULL; }
aDLinkBase *tail() { return last; }
int itemCount() { return count; }
virtual ~aDListBase();
};

template<class T>
class aDList : private aDListBase {
public:
    aDListBase::itemCount;     // Access modifier
    aDListBase::remove( M, s );
    int isLastItem( T *maybe ) { return aDListBase::isLastItem( maybe ); }
    int isFirstItem( T *maybe ) { return aDListBase::isFirstItem( maybe ); } friend class iterator;
    class iterator : public aDListBase::aniterBase {
    public:
        iterator( aDList &l, listResetLocation loc =toHead )
        : aDListBase::aniterBase( *(aDListBase *)&l, loc ) {}
        void operator ++( int ) { // postfix
            aDListBase::aniterBase::stepForward();
        }
        iterator &operator ++() {
            aDListBase::aniterBase::stepForward();
            return *this;
        }
        void operator --( int ) { // postfix
            aDListBase::aniterBase::stepBackward();
        }
        iterator &operator --() {
            aDListBase::aniterBase::stepBackward();
            return *this;
        }
        T *operator ()() { return (T *)current(); }
        void reset( listResetLocation loc =toHead ) { aniterBase::reset( loc ); }
    };
    void insert( T *i ) {
        aDListBase::insert( i );
    }
    void insertBefore( T *i, T *b ) { aDListBase::insertBefore( i, b ); }
    void append( aDLink<T> *a ) {
```

```
09/23/1994 15:11    Filename: DASHLIST.H                                Page 4 aDListBase::append( a );
    }
    aDList &operator +=( T *i ) { insert( i ); return *this; }
    aDList &operator &=( T *i ) { append( i ); return *this; }
    T *head() { return (T *)aDListBase::head(); }
    T *tail() { return (T *)aDListBase::tail(); }
};

// Generalized lookup facility for DLists. Specify the list to search,
// the value to key on, and the address of the member to compare.
template<class linkType, class memberType>
linkType *dlistFind( aDList<linkType> &list,       // List to search
                     memberType key,                // Value to search for
                     memberType linkType::*ptr )    // Pointer to member to check
{
    for( aDList<linkType>::iterator it(list); it() != NULL; it++ )
        if( it()->*ptr == key )
            break;
    return it();
} template<class T>
class aSortedDList : public aDList<T> {
public:
    void insert( T *i );
    void append( T *a ) { insert( a ); }
    aSortedDList &operator +=( T *i ) { insert( i ); return *this; }
    aSortedDList &operator &=( T *i ) { append( i ); return *this; }
};

// Insert in ascending order. Only really works if all items in list
// are in sorted order.
template<class T>
void aSortedDList<T>::insert( T *i )
{
    if( i == NULL ) {
        string reason = "NULL passed to ";
        reason += typeid(*this).name() + string("::insert()");
        throw aLinkedListException<aDLinkBase>( reason );
    }
    aDList<T>::iterator it(*this);
    T *ptr;
    // Find 1st item greater than this one. Failing that, append to list
    for( ptr = it(); ptr; ptr = (++it)() )
        if( *i < *ptr )
            break;
    if( ptr ) // Found if ptr != NULL
        aDList<T>::insertBefore( i, ptr );
    else
        aDList<T>::append( i );
} endif  // DASHLIST_H

// ------------------ End of $workfile:: DASHLIST.H    $ -------------
```

```
///////////////////////////////////////////////////////////////////////////
// File:    $Workfile:: BOOLEAN.H      $ - Define a simple boolean class //
//                                                                       //
// Supports finctions isTrue(), isFalse() and has int operator.          //
//                                                                       //
// Note - This is specific to MS/Window 3.x and Inmark's zApp.           //
//                                                                       //
// Copyright (C) 1991-93 by Darrell Myers Shively II.                    //
//                                                                       //
// IRREVOCABLE ROYALTY FREE LICENSE TO USE, MODIFY AND DISTRIBUTE THIS CODE //
// IS GRANTED TO AST RESEARCH, INC. AND ITS SUBSIDIARIES BY THE          //
// COPYRIGHT HOLDER, D. SHIVELY II.                                      //
//                                                                       //
// By dash                                                               //
// ////////////////////////////////////////////////////////////////////  //
//   Who       Date                    Comment                           //
//   ----      ----                    -------                           //
//   Dash      10/14/93      Inception                                   //
//   $Log:: /chief/include/BOOLEAN.H                               $     //
//                                                                       //
//   2     8/22/94 5:29p Dash                                            //
//   Changed to only haves values true and false. Added |= and &= operators. //
// /////////////////////////////////////////////// Environment: Ruby/Windows3.x/zApp // ifndef BOOLEAN_H
define BOOLEAN_H enum ( true = ( 0 == 0 ), false = ( 1 == 0 ) );

class boolean (
private:
    int data;
public:
    boolean(): data(false) ()

int isTrue() ( return data != false; )
    int isFalse() ( return data == false; )
    boolean( int x ):data(x ? true : false) ()
    boolean( boolean &b ) :data(b.data) ()
    operator int() ( return data; )
    boolean &operator|=( boolean &b ) (
        data |= b.data;
        return *this;
    )
    boolean &operator&=( boolean &b ) (
        data &= b.data;
        return *this;
    )
);

#endif

// ------------------------ End of $Workfile:: BOOLEAN.H       $ ------------------
```

```
09/23/1994 15:11          Filename: DASHTYPE.H                                Page 1

/*******************************************************************************
 * File:   dashtype.h - Platform indipendent data definitions.                  *
 *                                                                              *
 * Defines basic 8-, 16-, and 32-bit data types in a portable manner.           *
 *                                                                              *
 * Copyright (C) 1991-93 by Darrell Myers Shively II.                           *
 *                                                                              *
 * IRREVOCABLE ROYALTY FREE LICENSE TO USE, MODIFY AND DISTRIBUTE THIS CODE     *
 * IS GRANTED TO AST RESEARCH, INC. AND ITS SUBSIDIARIES BY THE                 *
 * COPYRIGHT HOLDER, D. SHIVELY II.                                             *
 *                                                                              *
 * By D. Shively II (dash)                                                      *
 *                                                                              *
 * Edit history:                                                                *
 *                                                                              *
 *    Who    Date        Comment                                                *
 *    Dash   -1985       Inception                                              *
 *    dash   10/26/93    Updated for Intel/DOS environment                      *
 *******************************************************************************/
#ifndef DASHTYPE_H
define DASHTYPE_H ifndef NULL
define NULL  (void *)0L
endif define self    (*this)      // SmallTalk'ish C++ corruption include "boolean.h"         // Handy true/false boolean data type

/*
 * Some status values
 */
#define OK      (0)
#define QUIT    (1)
#define BAD     (-1)
#define ABORT   (-2)

/*
 * Master type definitions. All others made in terms of these.
 */
#if defined(_MSDOS_)
    typedef char            byte;        // signed 8-bit
    typedef unsigned char   uByte;       // unsigned 8-bit
    typedef short           word;        // signed 16-bit
    typedef unsigned short  uWord;       // unsigned 16-bit
    typedef long            dword;       // signed 32-bit
    typedef unsigned long   uDWord;      // unsigned 32-bit
    typedef float           real;        // 32-bit float
#define DATATYPES
endif if defined(_AMIGA)
    typedef char            byte;        // signed 8-bit
    typedef unsigned char   uByte;       // unsigned 8-bit
    typedef short           word;        // signed 16-bit
    typedef unsigned short  uWord;       // unsigned 16-bit
    typedef int             dword;       // signed 32-bit
    typedef unsigned int    uDWord;      // unsigned 32-bit
    typedef float           real;        // 32-bit float
#define DATATYPES
endif
```

```
09/23/1994 15:11          Filename: DASHTYPE.H                                Page 2 ifndef DATATYPES
error  Platform neither Amiga nor MSDOS
#else
    typedef word            status;
endif /* ---------------------------- End of dashtype.h ---------------------------- */
```

```
09/23/1994  15:11        Filename: DYNAPIX.H                                    Page 1

////////////////////////////////////////////////////////////////////////////////
// File:   $Workfile: DYNAPIX.H  $ - DynaPix class definitions.               //
////////////////////////////////////////////////////////////////////////////////
// DynaPix classes (aDynaPix, aDynaPane, the mask and image classes) together //
// provide a facility for a window pane that can automatically update its     //
// imagery based on mouse placement masks.                                    //
////////////////////////////////////////////////////////////////////////////////
// Note - This is specific to MS/Window 3.x and Irmark's zApp.                //
////////////////////////////////////////////////////////////////////////////////
// Copyright (C) 1994 by AST Research, Inc.                                   //
////////////////////////////////////////////////////////////////////////////////
// By dash                                                                    //
////////////////////////////////////////////////////////////////////////////////
// $Log: /chief/include/DYNAPIX.H  $                                          //
////////////////////////////////////////////////////////////////////////////////
// 4    9/19/94 5:44p Dash                                                    //
// Changed to use aTempOStrstream for formatting output.                      //
//                                                                            //
// 3    9/02/94 4:25p Dash                                                    //
// Changed GDI resource scheme - sips much more lightly from the GDI segment. //
//                                                                            //
// 2    8/22/94 5:31p Dash                                                    //
// Speeded up refreshing by buffering display.                                //
//                                                                            //
// 1    8/22/94 10:25a Dash                                                   //
// Class definitions for DynaPix subsystem.                                   //
////////////////////////////////////////////////////////////////////////////////  Environment: Ruby/Windows3.x/zApp // ifndef DYNAPIX_H

// Image mask initialization record.
//
class aMaskInitRecord {
public:
    enum term { endOfList = -1 };

int eol;
    char *maskName;
    int requestedID;
    int imageID;
    boolean enabled;

aMaskInitRecord( char *name, int i, boolean enab, int iID =noImage )
      : maskName(name), requestedID(i), imageID(iID), enabled(enab), eol(false) {} boolean isEnd() { return eol; }
    aMaskInitRecord( term t ) : eol(true) {}
};

#ifdef OLD
class aMaskInitRecord {
public:
    enum term { endOfList = -1 };

int eol;
    char *maskName;         // ID in resource
    int requestedID;        // ID we want to be told of
    boolean enabled;        // Whether this mask will be initially active or not aMaskInitRecord( char *name, int i, boolean enab =true,
      : maskName(name), requestedID(i), enabled(enab), eol(0) {} aMaskInitRecord(term t):requestedID( endOfList ), eol(t) {}
```

```
09/23/1994  15:11        Filename: DYNAPIX.H                                    Page 2 boolean isEnd() { return eol; }
};
endif class anImageInitRecord {
public:
    enum terminator { EOL = -1 };
    zResId resID;
    int id;
    anImageInitRecord( zResId rID, int newID )
      : resID(rID), id(newID), eol(0) {}
    anImageInitRecord( terminator t ) : eol(t) {}
};

// Objects derived from aHotSpotter can get hotspot calls
// when the user clicks on an image hotspot
//
class aHotSpotter {
public:
    virtual void hit( int id ) {
        DB( DB_NORM, ("\nceHotSpotter::hit(%d)>", id ));
    }
};

class anImage : public aDLink<anImage>, public aDIBitmap {
private:
    friend class anImageList;
public:
    anImage( zResId resID, int newID ) : aDIBitmap(resID), id(newID) {}
    int ID() { return id; }
};

class anImageList : public aDList<anImage> {
public:
    anImage *operator[]( int id ) {
        return aDListFind( *this, id, &anImage::id );
    }
    typedef aDList<anImage>::iterator iterator;
    iterator iter() {
        return iterator( *this );
    }
};

class aDynaPic : public aDLink<aDynaPic> {
private:
    friend class aDynaPicList;
    zString bitmapName;     // Name of this resource
    zBitmap *mask;          // The mask, or matte
    aDIBitmap *pix;         // optional image associated with this hotspot
    zDisplay *disp;         // Where to display optional image
    zPoint pixOrigin;       // coordinates of image
    int id;                 // Menu id this hotspot corresponds to
    boolean enabled;        // Whether this hotspot is active or not
    boolean stateChange;    // Whether this mask is active or not
    aHotSpotter *user_;     // Whether enable state has changed since last draw
                            // Recipient of alert notice, may be NULL int scanRowForBlack( unsigned char *, int );
    int scanColumnForBlack( unsigned char *, int, int, int );
    zDisplay *canvas() { return disp; }
public:
```

```
09/23/1994  15:11      Filename: DYNAPIX.H                                Page 3 class aDynaPicException : public anExceptionBase {
public:
    aDynaPicException( string why ) : anExceptionBase( why ) {}
};
aDynaPic( aDIBitmap *p,
         char *maskName,
         zDisplay *d,
         int id,
         aHotSpotter *user,
         boolean enabled );

int ID() { return id_; }
void ID( int newID ) { id_ = newID; } aDIBitmap *picture() { return pix; }
zPoint origin() { return pixOrigin; }
zRect getArea();

void render( zDisplay * );
~aDynaPic();

const zString &name() { return bitmapName; }
boolean isHot( zPoint );
boolean isEnabled() { return enabled; }
boolean stateHasChanged() { return stateChange; }
void enableMask( boolean enab = true );
aHotSpotter *user() { return user; }
void user( aHotSpotter *newUser ) { user_ = newUser; }
operator zBitmap *() {
    return mask;
}
};

typedef aDynaPicList anImageMask;

class aDynaPicList : public aDList<aDynaPic> {
public:
    typedef aDList<aDynaPic>::iterator iterator;
    iterator iter() {
        return iterator( *this );
    }
    aDynaPic *operator[]( int id ) {
        return dListFind( *this, id, &aDynaPic::id_ );
    }
};

typedef aDynaPicList anImageMaskList;

// anInfoPane contains the graphical imagery.
//
class aDynaPane : public zPane {
    aDIBitmap backdrop_;        // Backdrop image
    zResId backdropID_;         // ID in resource of background bitmap
    zBitmap *imageBuff;         // Display buffer
    anImageList imagelist;      // List of dynamic imagery
    aDynaPicList dynaPiclist;   // List of hotspots aHotSpotter *defaultUser;   // Default user for dynaPix hits
    void buildBuffer();         // Generate buffer image
protected:
    zBitmap &imageBuffer() {    // display buffer accessor
        return *imageBuff;
    }
public:
    // Exception class. See definition of xmsg in Borland/ANSI docs.
```

```
09/23/1994  15:11      Filename: DYNAPIX.H                                Page 4 class badNews : public anExceptionBase {
    friend aDynaPane;
private:
    badNews( string why ) : anExceptionBase( why ) {}
};

aDynaPane( zWindow* W,
           zSizer *siz,
           zResId backDrop,
           aMaskInitRecord *m = NULL,
           anImageInitRecord* images = NULL,
           aHotSpotter *user = NULL );

virtual ~aDynaPane();

aDynaPicList &maskList() { return dynaPicList; }

// Backdrop palette accessor
aDIBitmap *backdrop() { return &backdrop; }
aPalette *palette() { return backdrop()->palette(); }

// zApp event handlers
int getHitID( zPoint );    // if in mask, return id; else -1
virtual int draw( zDrawEvt* );

};

endif
// ------------- End of $Workfile:: DYNAPIX.H           $
```

What is claimed is:

1. A method for detecting hotspots from a plurality of displayed hotspots on a window within a graphical user interface environment, said method comprising the steps of:

storing in a prioritized order a plurality of masks in a mask database such that each mask defines a set of valid coordinates for a hotspot located within a selected window within said graphical user interface environment, each valid coordinate represented by a selected state of a bit in a bitmap corresponding to said mask, each bit in said bitmap corresponding to a location on said window;

selecting at least one mask corresponding to a displayed window;

correlating a set of coordinates of a pixel located by a cursor to a bit in said bitmap of said at least one mask corresponding to said location on said window; and examining said bit of said bitmap to determine if said bit has said selected state to thereby determine a coincidence of said cursor with a selected hotspot.

* * * * *